United States Patent
Pordash et al.

(10) Patent No.: US 9,424,016 B2
(45) Date of Patent: Aug. 23, 2016

(54) METHODS, APPARATUSES, AND SYSTEMS RELATING TO AUTOMATION IN DISTRIBUTED SYSTEMS

(75) Inventors: Steve Pordash, Lakewood, WA (US); Johann Niederer, Frankenfels (AT); Franz Leimer, St. Pölten (AT); Andreas Griessler, Neulengbach (AT)

(73) Assignee: Automic Software GmbH, Wolfsgraben (AT)

( * ) Notice: Subject to any disclaimer, the term of this patent is extended or adjusted under 35 U.S.C. 154(b) by 1281 days.

(21) Appl. No.: 12/752,118

(22) Filed: Mar. 31, 2010

(65) Prior Publication Data

US 2011/0246896 A1    Oct. 6, 2011

(51) Int. Cl.
G06F 3/048 (2013.01)
G06F 9/445 (2006.01)

(52) U.S. Cl.
CPC .......................... G06F 8/60 (2013.01)

(58) Field of Classification Search
USPC .......................... 715/735; 717/124
See application file for complete search history.

(56) References Cited

U.S. PATENT DOCUMENTS

| | | | | |
|---|---|---|---|---|
| 6,662,312 | B1 * | 12/2003 | Keller et al. | 714/38.14 |
| 7,519,814 | B2 | 4/2009 | Rochette et al. | 713/167 |
| 2002/0080184 | A1 | 6/2002 | Wishoff | 715/800 |
| 2004/0010734 | A1 * | 1/2004 | Ghercioiu et al. | 714/38 |
| 2004/0107415 | A1 * | 6/2004 | Melamed et al. | 717/124 |
| 2004/0205772 | A1 | 10/2004 | Uszok et al. | 719/317 |
| 2005/0278274 | A1 | 12/2005 | Kovachka-Dimitrova et al. | |
| 2008/0178174 | A1 | 7/2008 | Woolen | 717/177 |
| 2009/0019315 | A1 * | 1/2009 | Belvin et al. | 714/38 |
| 2009/0049443 | A1 | 2/2009 | Powers et al. | 718/100 |

FOREIGN PATENT DOCUMENTS

| | | |
|---|---|---|
| WO | WO 02/077816 | 10/2002 |
| WO | WO 2008/059257 | 5/2008 |

OTHER PUBLICATIONS

Welcome document for UC4 Operations Manager software product, Version 6.00A935-005, 199 pages, publicly available prior to Mar. 31, 2009.
User Manual for UC4 Operations Manager software product, Version 6.00A935-005, 967 pages, publicly available prior to Mar. 31, 2009.
UC4 Script manual for UC4 Operations Manager software product, Version 6.00A935-005, 639 pages, publicly available prior to Mar. 31, 2009.
Administrator Manual for UC4 Operations Manager software product, Version 6.00A935-005, 780 pages, publicly available prior to Mar. 31, 2009.

(Continued)

*Primary Examiner* — William Trapanese
(74) *Attorney, Agent, or Firm* — Norton Rose Fulbright US LLP

(57) ABSTRACT

Apparatuses, systems and methods are presented. In one embodiment, the method includes receiving a graphical user interface part of a deployment file on a first computer, the deployment file configured to cause a second computer to perform a computer-implemented job. The method may also include loading the graphical user interface part of the deployment file on the first computer. Additionally, the method may include displaying an interactive graphical user interface on a display device in data communication with the first computer.

20 Claims, 21 Drawing Sheets

(56) References Cited

OTHER PUBLICATIONS

Inside UC4 manual for UC4 Operations Manager software product, Version 6.00A935-005, 414 pages, publicly available prior to Mar. 31, 2009.
Best Practice manual for UC4 Operations Manager software product, Version 6.00A935-005, 201 pages, publicly available prior to Mar. 31, 2009.
Sample Collection manual for UC4 Operations Manager software product, Version 6.00A935-005, 207 pages, publicly available prior to Mar. 31, 2009.
Application Integration manual for UC4 Operations Manager software product, Version 6.00A935-005, 307 pages, publicly available prior to Mar. 31, 2009.
Knowledge Base manual for UC4 Operations Manager software product, Version 6.00A935-005, 530 pages, publicly available prior to Mar. 31, 2009.
Modification Archive manual for UC4 Operations Manager software product, Version 6.00A935-005, 295 pages, publicly available prior to Mar. 31, 2009.
Quick Reference, Tips and Tricks, FAQ list, and Glossary for UC4 Operations Manager software product, Version 6.00A935-005, 11 pages, publicly available prior to Mar. 31, 2009.

\* cited by examiner

METHODS, APPARATUSES, AND SYSTEMS RELATING TO AUTOMATION IN DISTRIBUTED SYSTEMS

TECHNICAL FIELD

This disclosure relates to rapid automation in distributed systems and to methods and arrangements for execution and controlling of jobs in such systems.

BACKGROUND

Software agents are commonly used in distributed software environments. For example, network administrators often deploy device-monitoring agents to network servers and routing devices. The deployed agents typically collect a specified set of data and return results directly to a master server via, e.g., an SNMP connection.

In a typical system, a system administrator must manually deploy a set of agents to each remote network device. This process is both time consuming and expensive. Additionally, configuration of the agents and scheduling of jobs to be performed by the agents may be cumbersome and time consuming, often requiring a system administrator to physically interact with the devices at remote locations.

Another common issue in agent-based computing systems involves software development. Typically, a separate agent is required for every task to be performed on the remote systems. Development becomes difficult, because programming of agents generally requires intensive programming and testing to ensure that the agent is capable of accurately interacting with system and application interfaces.

Additionally, configuration of jobs to be performed by the agents is also problematic. For example, common systems require either a dedicated application interface for configuring jobs, or the entire agent must be loaded for the purpose of configuration. This often requires the system administrator to physically interact with a device on which the job is to be performed.

SUMMARY

Apparatuses, systems and methods are presented. In one embodiment, the method includes receiving a graphical user interface part of a deployment file on a first computer, the deployment file configured to cause a second computer to perform a computer-implemented job. The method may also include loading the graphical user interface part of the deployment file on the first computer. Additionally, the method may include displaying an interactive graphical user interface on a display device in data communication with the first computer.

In a further embodiment, the method includes receiving a job-configuration parameter from the interactive graphical user interface, and storing the job-configuration parameter in a database configured to be accessible by the first computer and the second computer. In such an embodiment, the database may be accessible by the first computer and the second computer through data communications with a server coupled to the database.

In one embodiment, the method may include obtaining a result of the computer-implemented job from the second computer, and displaying results of the computer-implemented job in the interactive graphical user interface. The method may include synchronously obtaining the result of the computer-implemented job from the second computer. In one embodiment, the method may include asynchronously obtaining the result of the computer-implemented job from a database.

In another embodiment, the method may include receiving an agent part of a deployment file on a second computer, the deployment file configured to cause the second computer to perform a computer-implemented job. Such an embodiment may also include loading the agent part of the deployment file on the second computer, and performing the computer-implemented job on the second computer according to a job-configuration parameter provided by a first computer configured to run a graphical user interface part of the deployment file.

In one particular embodiment, the method includes accessing a database managed by a server. In a further embodiment, the method may include obtaining the agent part of the deployment file from the database. The method may also include obtaining the job-configuration parameter from the database. In particular, the agent part may be configured to obtain the job-configuration parameter asynchronously from the database.

As the computer-implemented job is completed, the method may include storing a result of the computer-implemented job in the database. In one embodiment, the method includes synchronously communicating the result of the computer-implemented job to the first computer. Alternatively, the method may include asynchronously communicating the result of the computer-implemented job to the first computer through the database.

Another embodiment of a method is presented. In such an embodiment, the method may include receiving a request from a first computer for a graphical user interface part of a deployment file, the deployment file configured to cause a second computer to perform a computer-implemented job. The method may also include obtaining the graphical user interface part of the deployment file from a database configured to be accessible by the first computer and the second computer. The method may additionally include communicating the graphical user interface part of the deployment file to the first computer.

In a further embodiment, the method may include receiving a job-configuration parameter from the first computer, and storing the job-configuration parameter in the database. The method may also include communicating a result of the computer-implemented job to the first computer for display with the graphical user interface part of the deployment file.

Another embodiment of a method is presented. In one embodiment, the method includes sending an agent part of a deployment file to a second computer, the deployment file configured to cause the second computer to perform a computer-implemented job. The method may also include sending a job-configuration parameter to the second computer, a job-configuration parameter provided by a first computer configured to run a graphical user interface part of the deployment file. In a further embodiment, the agent part of the deployment file and the job-configuration parameter are stored in a database.

The method may also include receiving a result of the computer-implemented job from the second computer, and storing the result of the computer-implemented job in the database configured to be accessible by the first computer and the second computer.

Tangible computer program products comprising computer readable instructions, that when executed by a computer, cause the computer to perform the operations described above are also presented. In one embodiment, the computer program product may comprise data storage device comprising computer readable instructions for configuring a first computer, a second computer and a server as described below. In one embodiment, the computer readable instructions may be platform independent.

Apparatuses are also presented. In one embodiment the apparatus comprises a first computer. The first computer may include an input adapter, a processor, and a display adapter. In one embodiment, the input adapter is configured to receive a graphical user interface part of a deployment file, the deployment file configured to cause a second computer to perform a computer-implemented job. The processor may load the graphical user interface part of the deployment file on the first computer. Additionally, the display adapter may display an interactive graphical user interface on a display device in data communication with the first computer.

In a further embodiment, the first computer may include user interface controls configured to receive a job-configuration parameter from the interactive graphical user interface. The first computer may also include an output adapter coupled to the user interface controls, the output adapter configured to communicate the job-configuration parameter to a database configured to be accessible by the first computer and the second computer.

In one embodiment, the database is accessible by the first computer and the second computer through data communications with a server coupled to the database. The input adapter may obtain a result of the computer-implemented job from the second computer. The display adapter may then display the results of the computer-implemented job in the interactive graphical user interface on the display device. In particular, the input adapter may be configured to synchronously obtain the result of the computer-implemented job from the second computer. Alternatively, the input adapter may be configured to asynchronously obtain the result of the computer-implemented job from a database.

In another embodiment, the apparatus may be a second computer. The second computer may include an input adapter and a processor. In one embodiment, the input adapter may receive an agent part of a deployment file on a second computer, the deployment file configured to cause the second computer to perform a computer-implemented job. The processor may load the agent part of the deployment file on the second computer, and perform the computer-implemented job on the second computer according to job-configuration parameter provided by a first computer configured to run a graphical user interface part of the deployment file.

In one embodiment, the input adapter may access a database managed by a server. Further, the input adapter may obtain the agent part of the deployment file from the database. The input adapter may also obtain the job-configuration parameter from the database. In one embodiment, the input adapter is configured to obtain the job-configuration parameter asynchronously from the database.

The second computer may also include an output adapter configured to store a result of the computer-implemented job in the database configured to be accessible by the first computer. The output adapter may also synchronously communicate the result of the computer-implemented job to the first computer.

In another embodiment, the apparatus may be a server. The server may include an input adapter, a data adapter, and an output adapter. For example, the input adapter may receive a request from a first computer for a graphical user interface part of a deployment file, the deployment file configured to cause a second computer to perform a computer-implemented job. In such an embodiment, the data adapter may obtain the graphical user interface part of the deployment file from a database configured to be accessible by the first computer and the second computer. Additionally, the output adapter may communicate the graphical user interface part of the deployment file to the first computer.

In further embodiments of the server, the input adapter may receive a job-configuration parameter from the first computer; and the data adapter configured to store the job-configuration parameter in the database, and the output adapter may communicate a result of the computer-implemented job to the first computer for display with the graphical user interface part of the deployment file.

Another embodiment of a server is presented. In this embodiment, the server may include an output adapter configured to send an agent part of a deployment file to a second computer, the deployment file configured to cause the second computer to perform a computer-implemented job, and send a job-configuration parameter to the second computer, the job-configuration parameter provided by a first computer configured to run a graphical user interface part of the deployment file. The agent part of the deployment file and the job-configuration parameter may be stored in a database.

In a further embodiment, the server may include an input adapter configured to receive a result of the computer-implemented job from the second computer, and a data adapter coupled to the input adapter and configured to store the result of the computer-implemented job in the database configured to be accessible by the first computer and the second computer.

Systems are also presented. In one embodiment, the system includes a first computer, a second computer, and a server as described above. For example, the first computer may be configured to receive a graphical user interface part of a deployment file from a server, the deployment file configured to cause a second computer to perform a computer-implemented job, load the graphical user interface part of the deployment file on the first computer, display an interactive graphical user interface on a display device in data communication with the first computer, and send job-configuration parameter to the server. The second computer may be configured to receive an agent part of the deployment file from the server, load the agent part of the deployment file, and perform the computer-implemented job according to a job-configuration parameter provided by the first computer. The server may be coupled to the first computer and to the second computer. In such an embodiment, the server may be configured to send the graphical user interface part of the deployment file to the first computer, send an agent part of a deployment file to the second computer, and send the job-configuration parameter to the second computer.

In another embodiment, the system includes a first computer and a second computer. For example, the first computer may be configured to receive a graphical user interface part of a deployment file from a server, the deployment file configured to cause a second computer to perform a computer-implemented job, load the graphical user interface part of the deployment file on the first computer, display an interactive graphical user interface on a display device in data communication with the first computer, and send job-configuration parameter to the server. The second computer may be configured to receive an agent part of the deployment file from the server, load the agent part of the deployment file, and perform the computer-implemented job according to a job-configuration parameter provided by the first computer.

Another embodiment of a computer program product is presented. In one embodiment, the computer program product may include computer executable code configured to cause a computer system to include a database configured to manage at least one deployment file, a GUI client loading the GUI part of the deployment file, a framework loading the agent part of the deployment file, the deployment file comprising modules, the modules grouped in a GUI part and an agent part, the agent part being platform independent and being started and loaded by the framework, the GUI part comprising the GUI description of the agent, the agent comprising of jobs, the jobs can be started from the GUI part, the GUI part querying information from the agent part; wherein both the framework and the GUI can run on different machines.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

In the following the disclosure is explained in further detail with the use of preferred embodiments, which shall not limit the scope of the invention.

DETAILED DESCRIPTION OF THE PREFERRED EMBODIMENTS

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

While specific embodiments are described below with reference to particular configurations of hardware and/or software, those of skill in the art will realize that embodiments of the present disclosure may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

In one embodiment, methods, apparatuses and arrangements for processing, controlling and executing of jobs on distributed systems are disclosed. The distributed system can support processing, controlling, and executing of jobs, controlling or interfacing applications running on hosts located in a complex computer network under control of an automation engine and or GUI clients.

Figure 1:
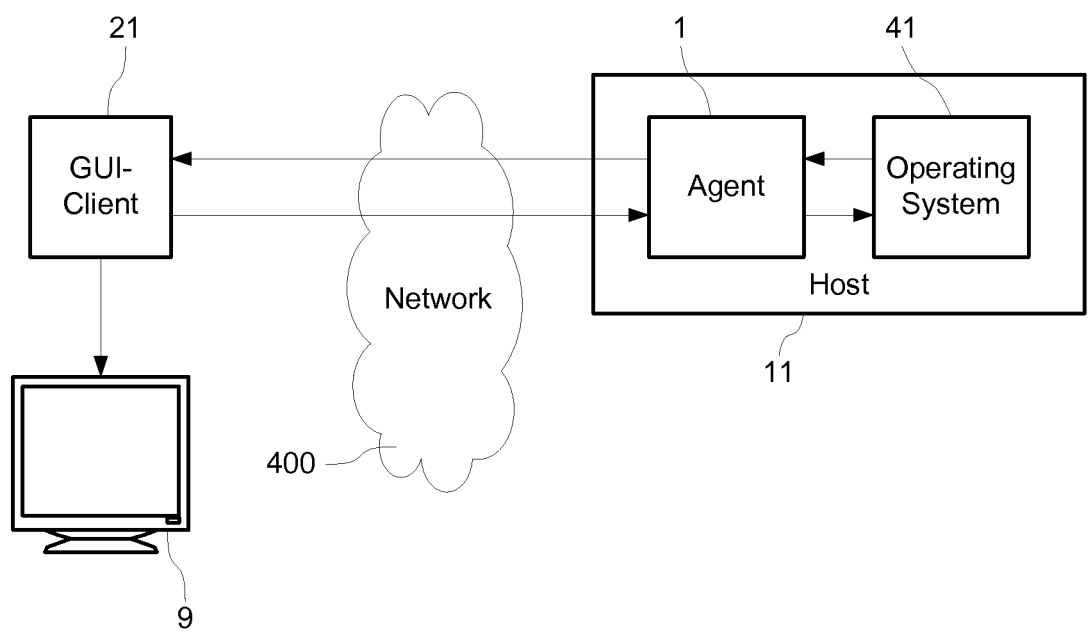
FIG. 1 is a block diagram of distributed system consisting of a GUI client and an agent.

FIG. 1 is a block diagram of a distributed system comprising an agent 1 running on a host 11. The agent can interact with the operating system 41 of the host 11. A GUI client 21 interacts with the agent 1 and can send messages to the agent and can receive information to be stored or displayed. The GUI client 21 may comprise a first computer and the host 11 may comprise a second computer. This architecture is typically used to start, execute and monitor commands or jobs on agents 1 whereas a result generated by such execution of jobs or commands can be send back and displayed on the GUI client. This architecture is used to remotely start jobs and to remotely control execution of jobs on a foreign host 11. The agent 1 runs on a host 11 and can be especially designed to start, execute and monitor a specific set of functions provided by an application or the operating system running on host 11. Moreover, agent 1 of a scheduling system shown in a distributed system of FIG. 1 is typically custom built for host 11 and its operating system 41.

An agent 1 can provide functionality to another system such as a GUI client 21 which can query data of the agent or can use functionality of the agent. This functionality can comprise functions of the host 11, functions of its operating system 41, or special functions provided by the agent 1, or all of them. A command can be an elementary function provided by the host 11, its operating system 41, or agent 1. A job can be a sequence or series of commands or a statement to execute or call other job in a given order. A job can comprise thousands or just one step, whereas a step can be a definition, control statement, command, or a statement to execute or call another job.

A scheduling system is a system comprising at least an agent to execute functionality on a dedicated system wherein another system (such as a GUI client 21 of FIG. 1) can start or query functions of the agent. A job scheduling system is a scheduling system wherein at least one agent can execute jobs. An application scheduling system is a scheduling system wherein at least one of the agents can start, query or call functionality of an application running on a host 11.

A distributed system is a system comprising several software components which can run on different hosts. Today, a variety of different approaches exist to enable communication between such components. Such communication techniques can be packet-oriented or connection-oriented, messages- or stream-based, or can use any network architecture to enable transport of information.

Figure 2:
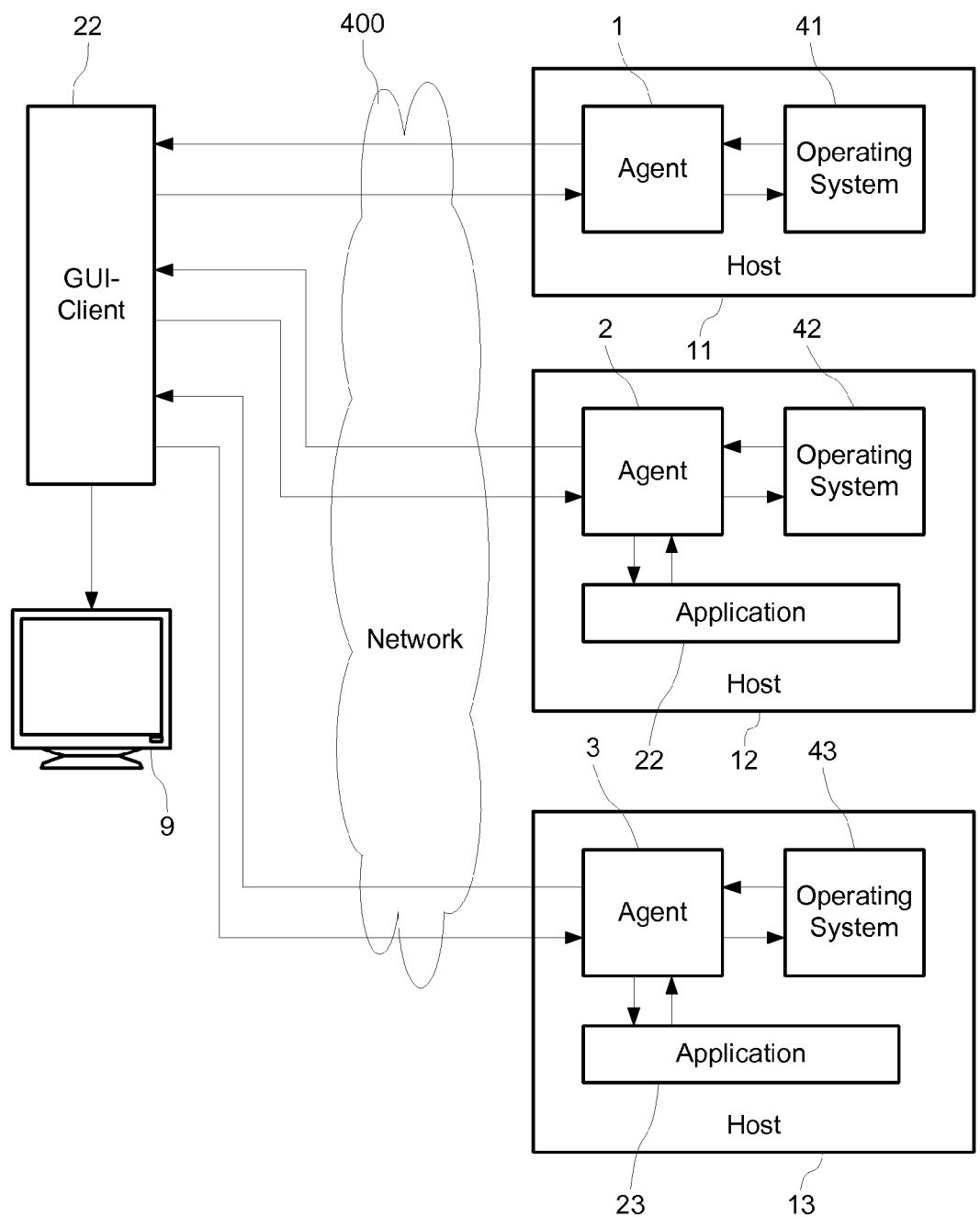
FIG. 2 is a block diagram of distributed system consisting of a GUI client and a series of agents.

FIG. 2 is a block diagram of a distributed system similar to FIG. 1, comprising several agents 1, 2, and 3 connected to a GUI client 22. The scheduling system of FIG. 2 uses three agents 1, 2, and 3, though the number of agents connected to the GUI client can be unlimited. In FIG. 2, each agent can offer new functionality and or functionality based on its operating system. The agents 2 and 3 of FIG. 2 can offer functionality based on certain applications 22 and 23. Such agents can be used to control applications or processes in applications. In other examples, such agents can be used to feed data into applications or to collect data from applications.

All agents of FIG. 2 are connected to a GUI client, which enables the user to access the functionality made available by the agents. In other examples, the GUI clients can have additional functionality which can be to allow scheduling of jobs or execution on the agents. In another example the agent 1 can offer scheduling functionality to schedule jobs to be run at a certain time on a certain host 11-13.

Figure 3:
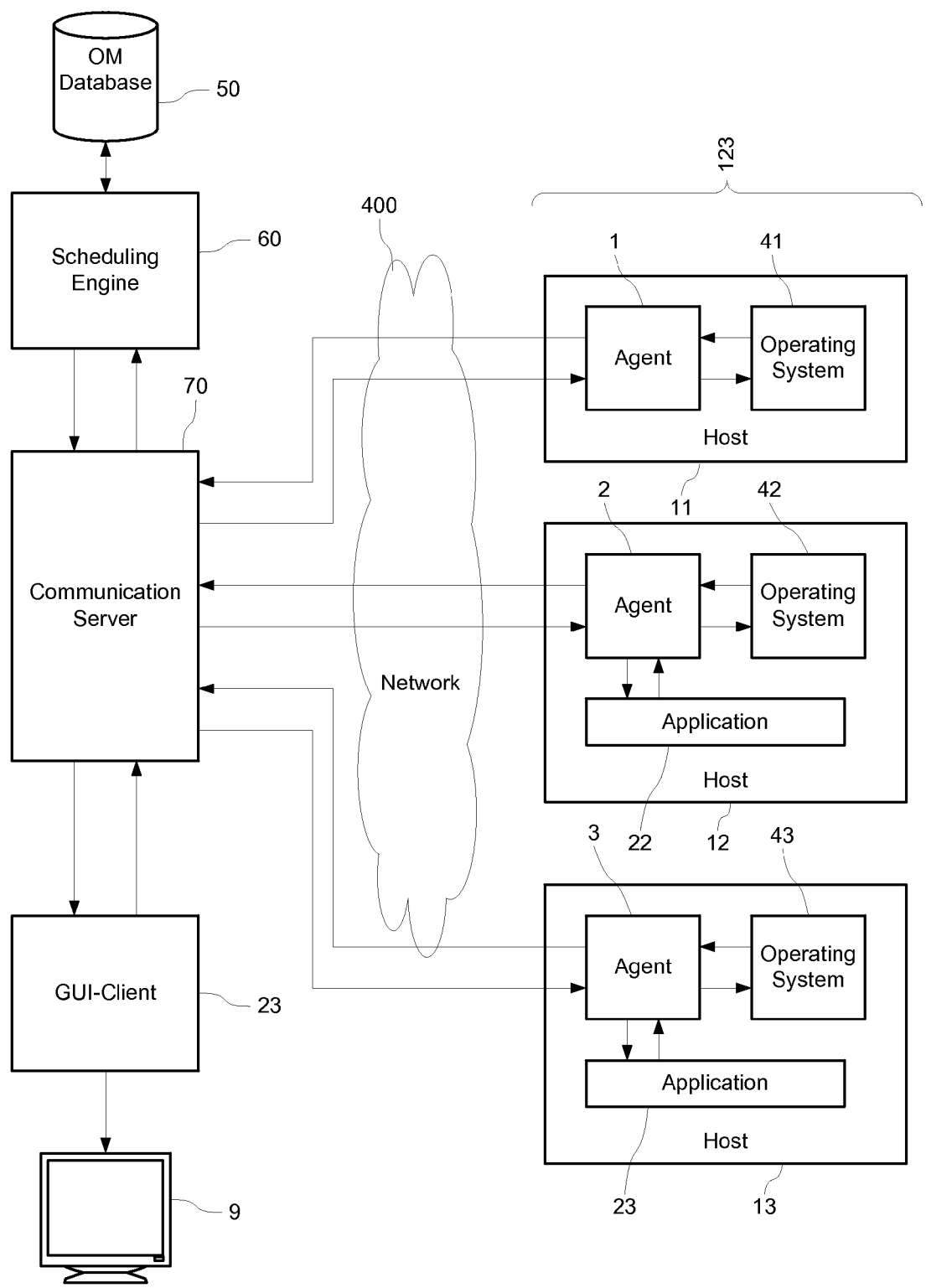
FIG. 3 is a block diagram of distributed system consisting of a GUI client, a communication center, a scheduling server, and a series of agents.

FIG. 3 is a block diagram of a scheduling system comprising agents 1, 2, and 3, at least one GUI client 23, a communication server 70, a scheduling engine 60, and a database 50. The agents can offer functionality based on operating systems they run on. Other agents such as agent 2 and 3 can have an interface to applications to control them and to start, stop, control or monitor processes in the applications. Agents which offer functionality based on applications are called adaptors.

As shown in FIG. 3 the agents can be connected to a communication server 70 which can comprise of a series of communication processes. Each communication process can act as a router. The GUI client 23 can be connected to the communication server and can communicate with the agents and with the scheduling engine 60 through this communication server 70. The scheduling server 60 can have access to a database 50 which can be used to store scheduling information or information on jobs which can be sent and executed by the agents 123. The scheduling server 60 can have functionality to schedule task which have to be performed on agents at a certain time. The GUI client can be used to modify scheduling information such as start times, assignment of destination hosts, job-configuration parameters, or development and editing of jobs.

When the scheduling engine determines that a certain task has to be performed, it can load all necessary information for that task from the database 50. An example of a task that can have to be performed at a certain time is a job to be executed on a certain host. The scheduling engine 60 can load the job definition from the database 50 and can send the job to that agent of the host the job is associated with. The agent can receive the job, then start, execute, and monitor it. The agent can collect output data and information of the job. Once the job is executed on the host, the agent can send the gathered information (e.g. return status) back to the scheduling engine 60 through the communication server 70 and over a network infrastructure 400. The communication server can have the role of a distributor or an internal router for the scheduling engine 60.

Many different operating systems are used today. These operating systems can differ widely in user handling, look and feel, execution, maintenance, user definitions, or even user permissions. As a result, a job which runs on Unix can be quite different from a job that runs on on z/OS or Microsoft Windows.

Jobs depend on the host platform, the agents, and applications they interface. For example, a job that runs on host 12, the host having an operating system 42, may be completely different form a job which runs on a host 11, the host 11 having an operating system 41.

Applications can be developed for one or more operating systems and hosts. Applications which are ported to another host typically have different properties, behavior, features and functions, and interfaces. Therefore, an application 22 running on host 12, the host having operating system 42, which has been ported to application 23 running on host 13 having operating system 43 has different properties.

Agents normally are very specialized and system dependent-agents can be developed for one operating system and may need to be completely redeveloped to serve the same purpose on another operating system or another host system. The executables can depend on the processor type, the host configurations, and the operating system. Agents that interface with a certain application need to interface with dedicated programming interfaces of the applications. This application interfaces can differ from operating system to operating system.

As a result, if agents have to be developed for O operating systems, H host types, and A applications running on the hosts, O times H times A agents must be developed, the agents serving A applications.

Embodiments for execution in a distributed network are described in the following figures. Agents can be started and run by an RA framework running on a host. RA is the abbreviation of the term Rapid Automation. The agents can interface the operating system of the host and applications running on the host via application programming interfaces (APIs). The agents can communicate with a graphical user interface (GUI) which can query information from the agents. The agent can comprise job definitions, whereas these jobs can be started from a scheduling engine. Configurations of the agent and the jobs can be edited in the GUI and stored in the database. The RA framework can load the newest agents from the database. Once the agent is loaded, the newest configurations for the agents and their job definitions can be loaded from the database.

Figure 4:
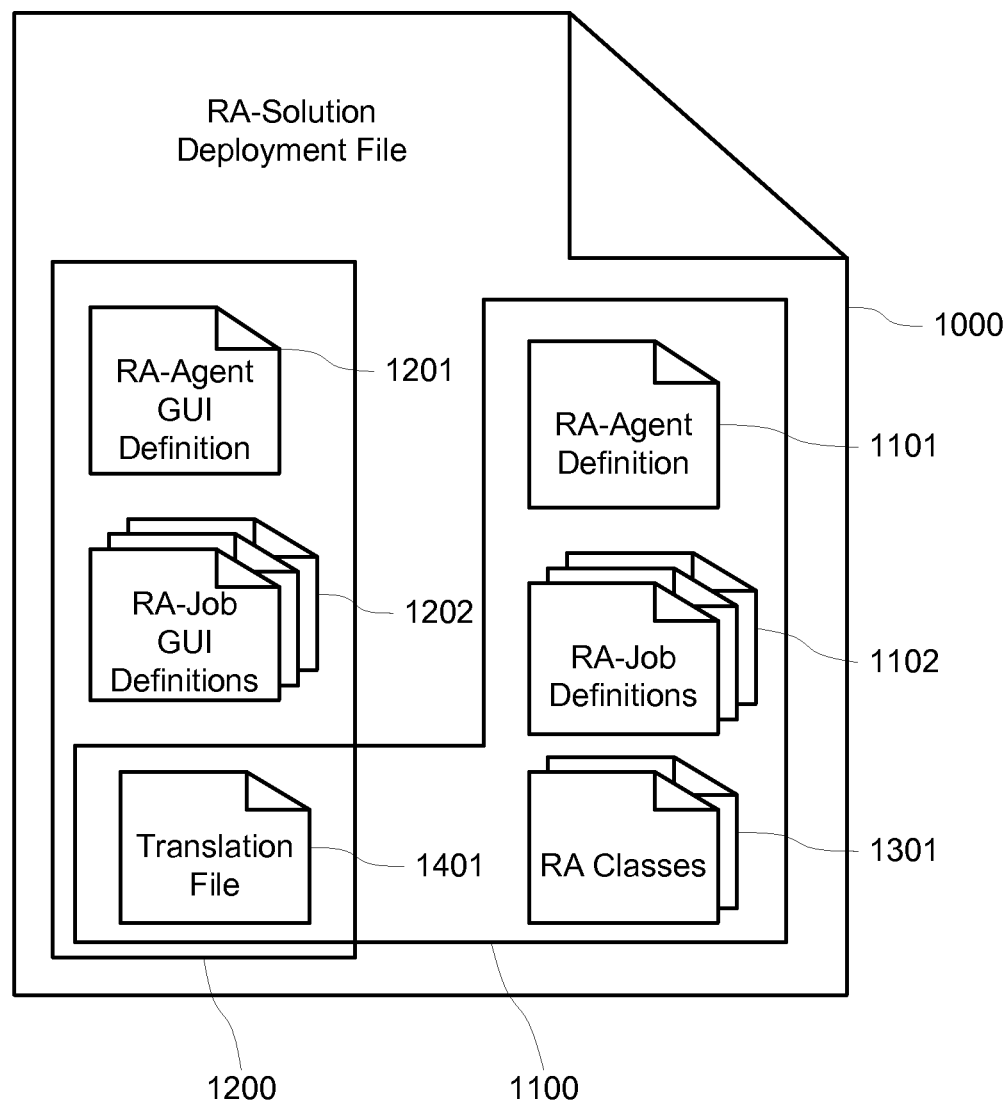
FIG. 4 is a diagram of a deployment file and its contents.

FIG. 4 shows a block diagram overview of an RA solution deployment file 1000. The file can be an archive file, e.g., of type jar. The file can comprise an RA agent definition part 1101 and zero, one, or several RA job definition parts 1102. RA job definition parts belong to RA agent definition parts. The RA solution deployment file can also comprise of an RA agent GUI definition 1201 and zero, one, or several RA job GUI definitions 1202. The GUI definition 1201 belongs to the agent definition 1101. The GUI definitions 1202 belong to the job definitions 1102. For each RA job definition 1102 an RA job GUI definition 1202 can exist.

Figure 9:
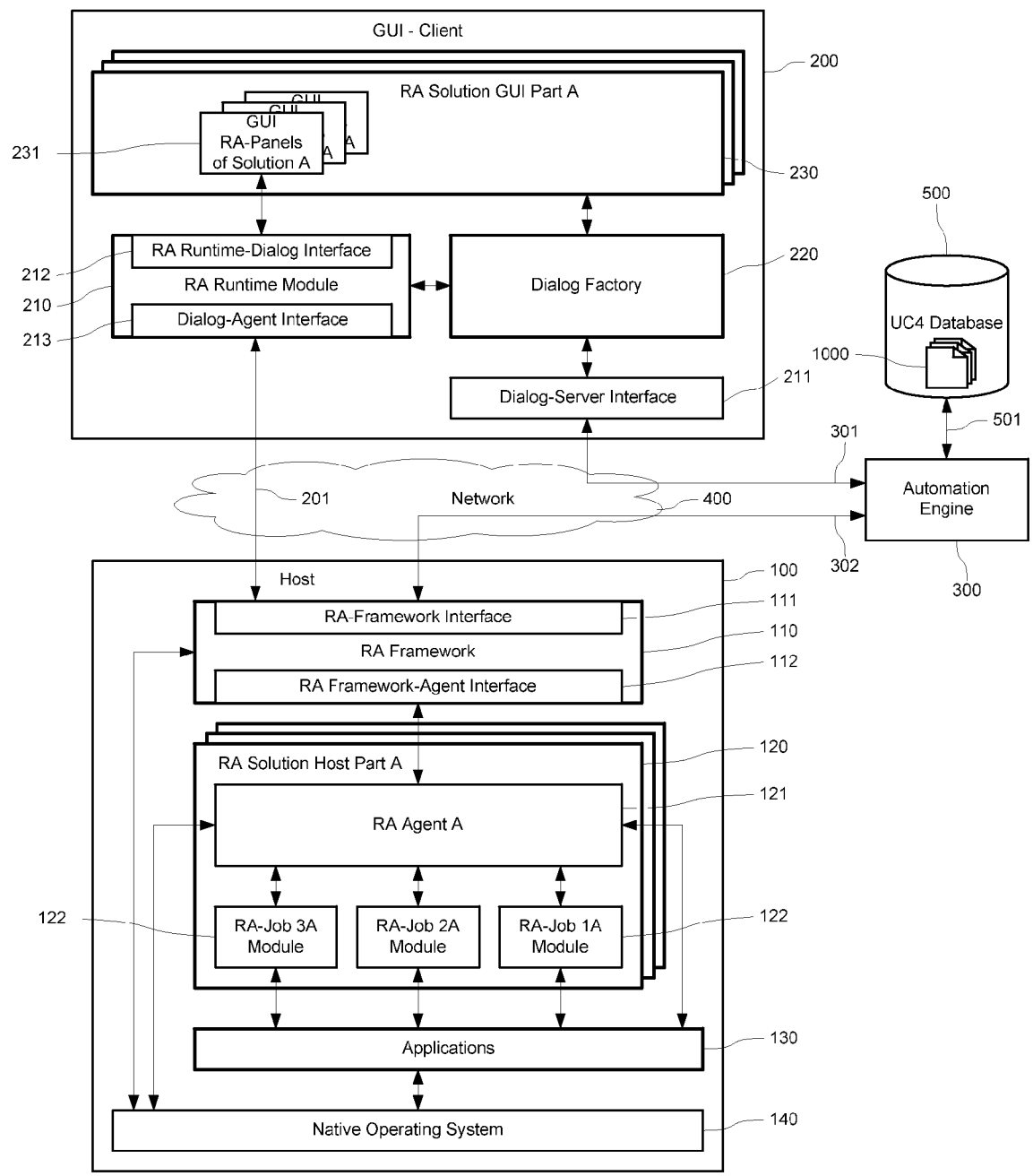
FIG. 9 is a block diagram of a distributed system consisting of a GUI client having an RA-runtime module, a dialog factory and RA-Solutions GUI part, an RA-framework running on a host, the RA-Solutions Host part, and an automation engine.

The RA agent definition 1101 can comprise all code and executables necessary to run an agent on a certain host in an RA framework—see FIG. 9. The RA Job definitions 1102 can comprise all code and executables to perform a specific task or job. This task or job can be special for a certain host or can be a certain application running on a host. Therefore, a RA Job definition can also be a job that can call a certain function of the application programming interface of a certain application.

The RA agent GUI definition 1201 can comprise all graphical controls to control an RA agent and to define all settings the agent needs to run. The RA agent GUI definitions 1202 can comprise all graphical controls to define all settings RA jobs needs to run. Each RA job can have a RA job GUI definition. The definitions 1202 can even have controls to start the corresponding RA job and to control RA job execution.

In an embodiment, the RA solution deployment file 1000 can also comprise RA class definitions 1301 and a translation file 1401. The RA classes definition 1301 can comprise classes which the RA agent and the RA jobs can use. The translation file 1401 can contain all messages and texts which are output or displayed in several languages.

The definitions within block 1100 can be called RA solution agent part. The definitions within block 1200 can be called RA solution GUI part. The main component of block 1100 is the RA agent definition 1101. The RA solution GUI part 1200 can contain the panels and user interface descriptions for the programs and contained in block 1100.

The definition blocks shown in FIG. 4 as part of the RA solution deployment file 1000 contain the description and implementation of the respective component. The definition blocks of the deployment file 1000 do not refer to running instances.

An RA solution contains in some embodiments an agent part and a graphical user interface part. In the following, the graphical user interface part is referred to as GUI part. The GUI part can contain but is not limited to controls such as check boxes, menus, buttons, drop-down field. The GUI part is designed to provide all control panels to the user for human interaction and can contain in some embodiments program code to process a certain flow. In some embodiments the RA solution GUI part enables the user so set, modify, reset, or amend parameters of the components contained in the RA solution agent part. In such an embodiment the RA solution GUI part can represent the user interface of the RA solution agent part.

In the following figures several embodiments of running instances of RA solutions are shown.

Figure 5:
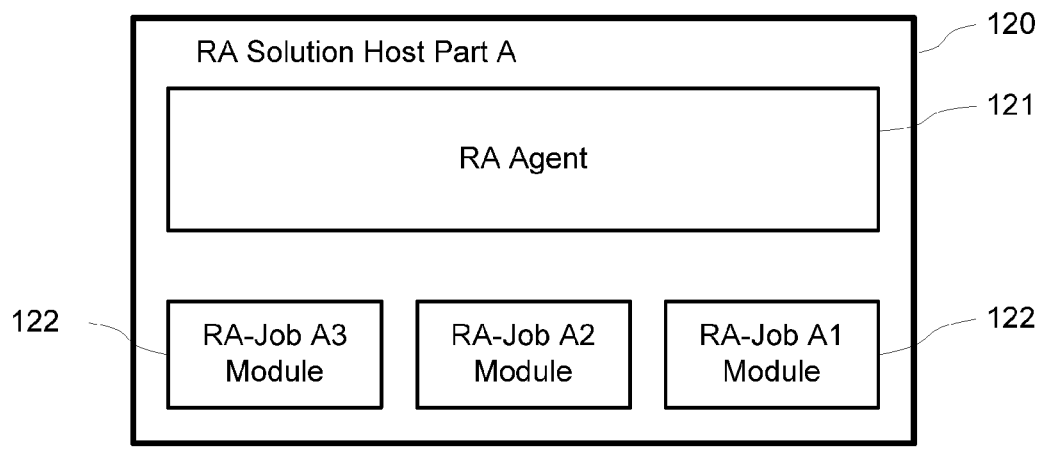
FIG. 5 is a block diagram of the host part of an RA-solution.

FIG. 5 is a block diagram of a running instance of the agent part 120 of an RA solution. The RA solution agent part 120 can comprise an RA agent 121 and a series of RA solution jobs. The RA agent 121 can be the running instance of the RA agent definition 1101. The RA agent jobs 122 can be the running instances of RA job definitions 1102.

Figure 6:
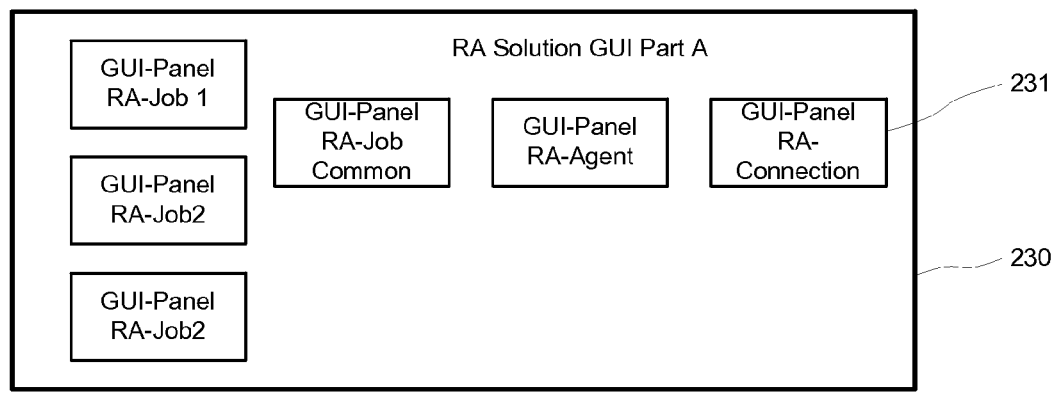
FIG. 6 is a block diagram of the GUI part of an RA-solution.

FIG. 6 is a block diagram of a running instance of the GUI part of an RA solution. The RA solution GUI part 230 can comprise RA GUI panels 231. The RA GUI panels 231 can be the running instances of the RA agent GUI definition 1201 and the RA job GUI definitions 1202.

Figure 7:
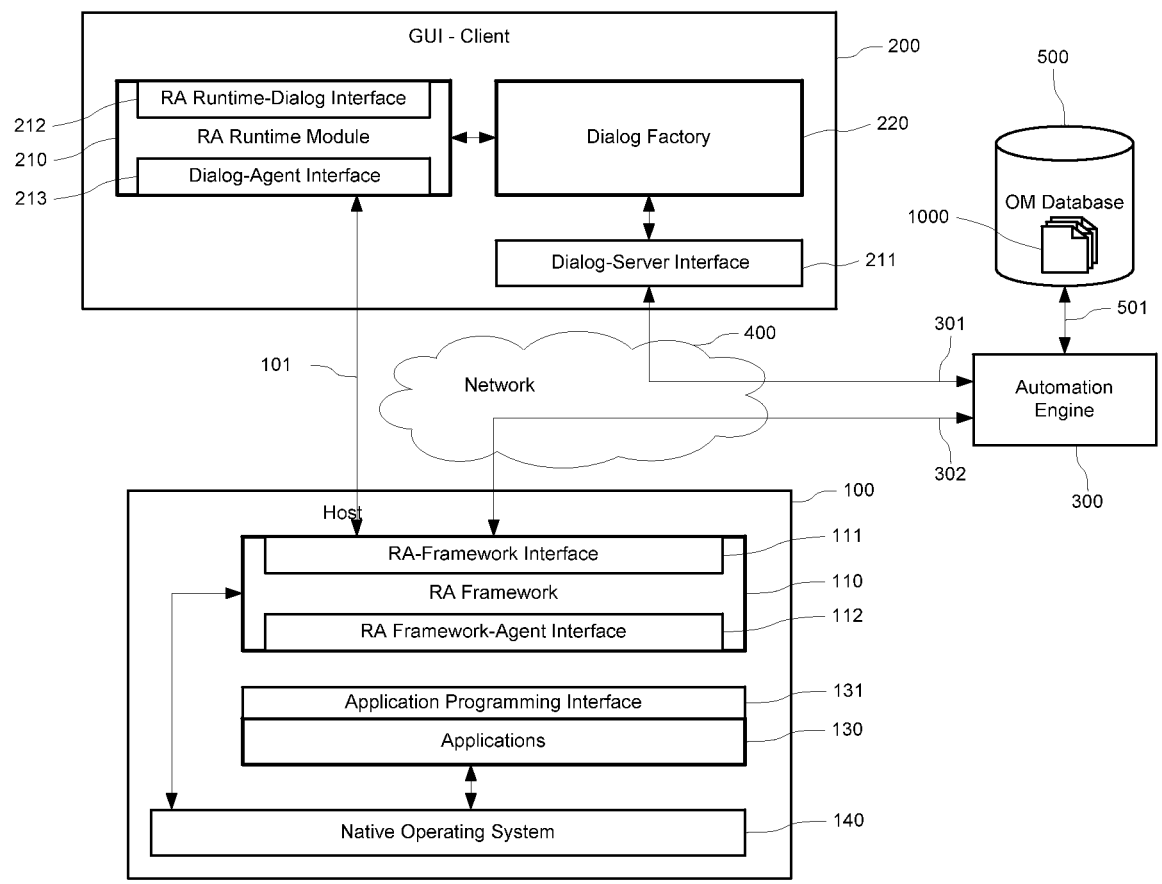
FIG. 7 is a block diagram of a distributed system consisting of a GUI client having an RA-runtime module and a dialog factory, an RA-framework running on a host, and an automation engine.

FIG. 7 is a block diagram of a distributed system consisting of a GUI client having an RA-runtime module and a dialog factory, an RA-framework running on a host, and an automation engine. The host 100 uses an operating system 140 whereby an application 130 is running on the same host. The host may be located in a separate network and may be connected to other hosts over a network 400.

Application 130 can provide an application programming interface 131 to allow control by other applications. Such an application programming interface can be of any complexity and can allow other applications to access, control, start, change, or monitor processes or states of the application 130.

Host 100 can host an RA framework 110. The framework can interface with the operating system and can have an RA framework agent interface which will be explained and used in the next figures. The framework can also have an RA framework interface to allow communication to an automation engine 300 over connection 302 or an RA runtime module 210 of a GUI client 200 over connection 101.

The GUI client 200 can comprise a dialog factory 220, an RA runtime module 210 and a dialog server interface 211. The RA runtime module can have a RA runtime dialog interface 212 to communicate with RA panels which will be shown in the following figures. It can also have a dialog agent interface 213 to allow communication to the RA framework. The dialog factory can have a dialog server interface 211 to communicate with an automation engine 300 over connection 301.

The automation engine 300 can interface the dialog server interface 211 and the RA framework and can have connection to a database 500 which can store RA solution deployment files 1000.

The RA framework can be an execution framework of agents and can be a virtual machine. It can be implemented for a specific host 100 running with an operating system 140. The RA framework can retrieve the RA solution host part from a database or storage 500.

FIG. 7 shows a distributed system using RA solutions in an initial phase. The RA framework 110 which can be implemented for the particular host 100 and its operating system 140 is ready to retrieve host parts of RA solutions to run. The RA framework may be able to retrieve, load, execute, control, quit, and unload RA agents. The RA framework may in some embodiments be seen as a software agent which acts as a starting platform running on a host, which can retrieve modules to be executed. Therefore, in an embodiment of the present disclosure the RA framework can act as a virtual machine which is able to run platform independent code. In this embodiment, the RA solution host part 1100 shown in FIG. 4 and its running instance 120 which is shown in FIG. 5 can be implemented in a platform independent language based on a virtual machine such as JAVA.

In one embodiment, the dialog client 220 of FIG. 7 can be a core component of the GUI client 200. The dialog client 220 can be able to retrieve GUI descriptions from an external database and can render and visualize windows or frames according to the descriptions received. The dialog client may in some embodiments act as a rendering engine and may in other embodiments act as an interpreter which displays graphical and textual components for user interaction on a display. The dialog client 220 can display graphical user-interfaces to a human user and to receive input from the user. As the dialog client 220 can have a complete description of graphical components to be displayed, it can manage all data which is contained in the description. Such data can comprise default parameters for graphical components, settings, lists, or even graphical images. Examples of such data can be descriptions of graphical menus, information of checkboxes which are set or which radio-buttons are set. The dialog factory can be responsible to display data to the user and to assist the user in amending it.

The process of user interaction can be as follows: The dialog factory 220 can receive the description of a user interface from a database 500 or a server 300 over a dialog-server interface 211. The description can contain the description of all graphical elements, windows or frames to be displayed as well as the data to be presented to the user. The dialog factory 220 can render and display the user interface according to the description and can display the data to the user. The user can view, amend and complete the data. Once the user or the user interfaces initiates saving the data, the data can be written back over the dialog-server interface 211 to the database 500 or a server 300.

The user interface 200 can comprise an RA runtime module which can comprise runtime libraries to enable the user interface to run GUI parts of RA solutions. The runtime module 210 can have an RA-runtime dialog interface 212 to communicate with GUI parts of RA solutions and a dialog agent interface 213 to communicate with RA frameworks 110 which run the host part of RA solutions the GUI parts of RA solutions correspond to. FIG. 6 is a block diagram of such a running instance of the GUI part of an RA solution.

Figure 8:
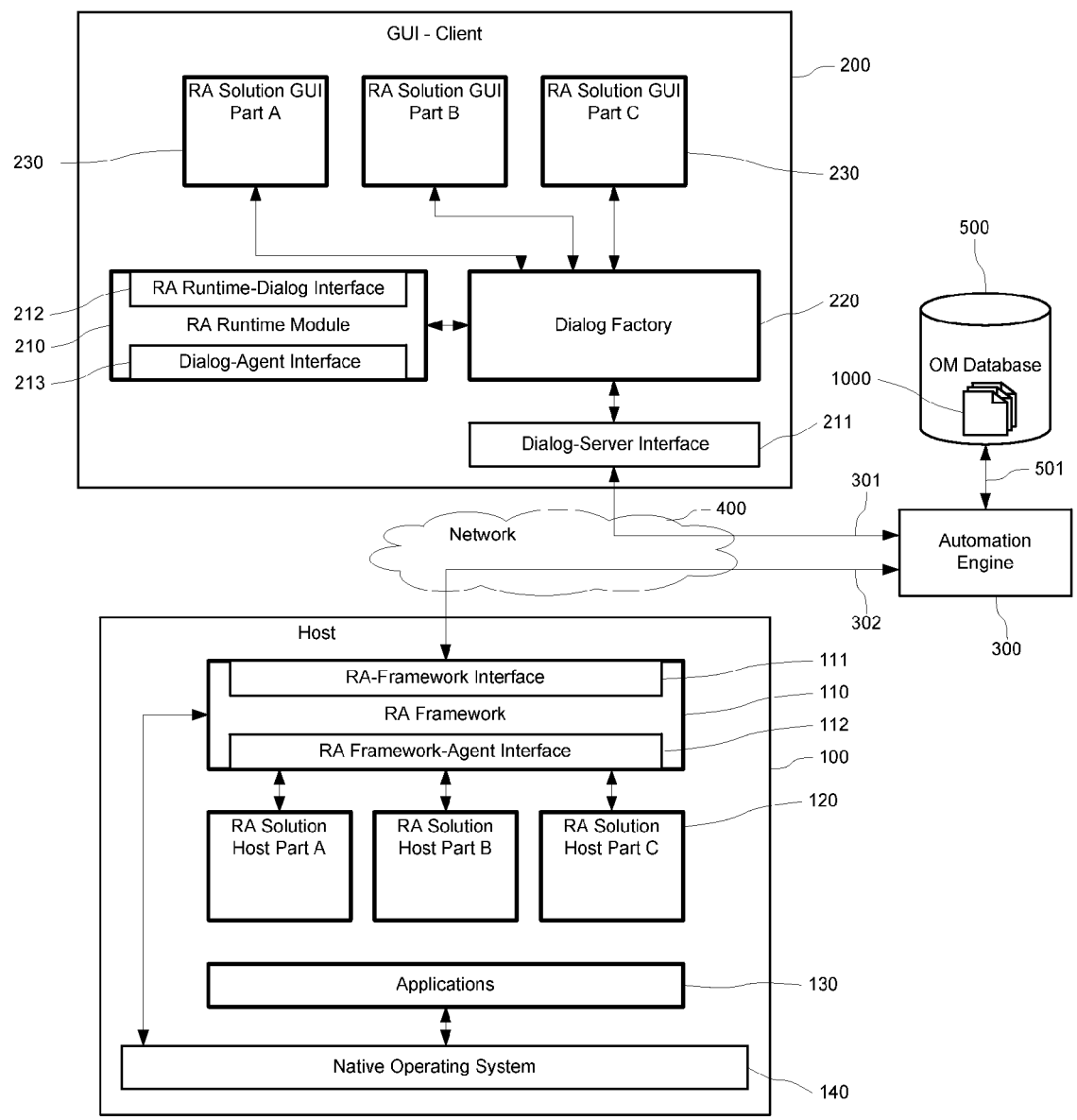
FIG. 8 is a block diagram of a distributed system consisting of a GUI client having an RA-runtime module, a dialog factory and RA-Solutions GUI part, an RA-framework running on a host, the RA-Solutions Host part, and an automation engine.

FIG. 8 is a block diagram of a distributed system consisting of a GUI client having an RA-runtime module, a dialog factory and RA-Solutions GUI part, an RA-framework running on a host, the RA-Solutions Host part, and an automation engine. FIG. 8 shows a distributed system which has loaded three RA solutions A, B, and C. An RA solution 1000 such as that shown in FIG. 4, can be deployed once in a database 500. It can comprise an RA solution host part 1100 and an RA solution GUI part 1200. When an RA solution is activated, the host part 1100 can be sent to an RA framework 110 of a host 100. The framework can integrate and start the host part to form a running instance 120 which is shown in FIG. 5 in more detail. The GUI part 1200 can be sent to the GUI client when the user requests access to RA parameters, to start an RA job or when the GUI client is started. The GUI client 200 can integrate and start the GUI part to form a running instance 230 which is shown in FIG. 6 in more detail.

As the dialog factory can handle graphical components, the dialog factory can also handle graphical components such as RA solution GUI parts and can integrate them in the graphical user interface.

FIG. 9 is a block diagram of a distributed system incorporating running instances of RA solutions, the distributed system consisting of a GUI client 200 having an RA-runtime module 210, a dialog factory 220 and RA-Solutions GUI part 230, an RA-framework 110 running on a host 100, the RA-Solutions Host part 120, and an automation engine. This figure shows a system having running RA solutions.

The framework 110 has loaded and activated several RA solutions host parts 120, each RA solution having an RA agent 121. RA solutions host part 120 can also comprise a variety of RA jobs 122 associated to an RA agent 121. The jobs can communicate with applications 130.

The first computer may include an input adapter, a processor, and a display adapter. In one embodiment, the input adapter is configured to receive a graphical user interface part 230 of a deployment file 1000, the deployment file 1000 configured to cause a second computer to perform a computer-implemented job. The processor may load the graphical user interface part 230 of the deployment file 1000 on the first computer. Additionally, the display adapter may display an interactive graphical user interface on a display device 9 in data communication with the first computer.

In a further embodiment, the first computer may include user interface controls configured to receive a job-configuration parameter from the interactive graphical user interface. The first computer may also include an output adapter coupled to the user interface controls, the output adapter configured to communicate the job-configuration parameter to a database 500 configured to be accessible by the first computer and the second computer.

In one embodiment, the database 500 is accessible by the first computer and the second computer through data communications with a server coupled to the database 500. The input adapter may obtain a result of the computer-implemented job from the second computer. The display adapter may then display the results of the computer-implemented job in the interactive graphical user interface on the display device 9. In particular, the input adapter may be configured to synchronously obtain the result of the computer-implemented job from the second computer. Alternatively, the input adapter may be configured to asynchronously obtain the result of the computer-implemented job from a database 500.

For example, the dialog factory 220 can load RA solutions GUI part from a database 500 over a dialog server interface 211 and can integrate and activate them to form running instances 230. The dialog factory can integrate the RA solutions host part in frames or windows, and can display and render them.

The RA solutions host part can comprise a variety of RA panels for each RA solution. As an example, an RA solution GUI part 230 can have panels for parameters to be provided for the agent 121 of the same solution and the jobs 122 associated to it.

The second computer may include an input adapter and a processor. In one embodiment, the input adapter may receive an agent part 1100 of a deployment file 1000 on a second computer, the deployment file 1000 configured to cause the second computer to perform a computer-implemented job. The processor may load the agent part 1100 of the deployment file 1000 on the second computer, and perform the computer-implemented job on the second computer according to job-configuration parameter provided by a first computer configured to run a graphical user interface part 230 of the deployment file 1000.

In one embodiment, the input adapter may access a database 500 managed by a server. Further, the input adapter may obtain the agent part 1100 of the deployment file 1000 from the database 500. The input adapter may also obtain the job-configuration parameter from the database 500. In one embodiment, the input adapter is configured to obtain the job-configuration parameter asynchronously from the database 500.

The second computer may also include an output adapter configured to store a result of the computer-implemented job in the database 500 configured to be accessible by the first computer. The output adapter may also synchronously communicate the result of the computer-implemented job to the first computer.

The RA panels 231 can display information from RA components running on host 100. This information can be static or stored with the panels. Information can also be queried directly from the RA components. Therefore, the panels which can use the RA runtime module 230 can send a query through the dialog agent interface 213 to the framework 110. The framework can route the query to the corresponding RA solution host part 120 where an agent 121 can take the query. The agent can query information from the host 100, the operating system 140 or applications 130 to answer the query received from the panel. Subsequently, the agent can return the requested information to the panel over the RA framework which can route the message back to the RA runtime module which can forward the queried information to the corresponding panel. As an example, when the user clicks on an RA panel having a drop-down field, the drop-down field shall be filled with all programs registered as a service on host 100. The RA panel sends a query to the framework 110 over the dialog-agent interface 213 of the RA runtime module 210. The framework forwards the query to the corresponding agent 121 which can query the operating system 140 to create a list of names of the programs which are registered as a service. Once the agent has created the list, it can return the list to the framework which can forward the list to the panel over the RA runtime module.

RA panels can belong to the same RA solution as the corresponding RA agent with its RA jobs and can have functionality to query information from the RA agent. In another embodiment of the disclosure, the panels can offer the user to start any of the RA jobs. In another embodiment, the panels can show parameters of the RA solution, the RA agent or RA jobs to the user and can allow the user to change or set it. Such parameters can be stored with the solution by the dialog factory in the database 500.

The server may include an input adapter, a data adapter, and an output adapter. For example, the input adapter may receive a request from a first computer for a graphical user interface part 230 of a deployment file 1000, the deployment file 1000 configured to cause a second computer to perform a computer-implemented job. In such an embodiment, the data adapter may obtain the graphical user interface part 230 of the deployment file 1000 from a database 500 configured to be accessible by the first computer and the second computer. Additionally, the output adapter may communicate the graphical user interface part 230 of the deployment file 1000 to the first computer.

In further embodiments of the server, the input adapter may receive a job-configuration parameter from the first computer; and the data adapter configured to store the job-configuration parameter in the database 500, and the output adapter may communicate a result of the computer-implemented job to the first computer for display with the graphical user interface part 230 of the deployment file 1000.

Another embodiment of a server is presented. In this embodiment, the server may include an output adapter configured to send an agent part 120 of a deployment file 1000 to a second computer, the deployment file 1000 configured to cause the second computer to perform a computer-implemented job, and send a job-configuration parameter to the second computer, the job-configuration parameter provided by a first computer configured to run a graphical user interface part 230 of the deployment file 1000. The agent part 120 of the deployment file 1000 and the job-configuration parameter may be stored in a database 500.

In a further embodiment, the server may include an input adapter configured to receive a result of the computer-implemented job from the second computer, and a data adapter coupled to the input adapter and configured to store the result of the computer-implemented job in the database 500 configured to be accessible by the first computer and the second computer.

For example, FIG. 7, FIG. 8, and FIG. 9, also show an automation engine 300 which can in one embodiment act as a server to access the database. In another embodiment, the automation engine 300 can be a scheduling engine which can start RA jobs on the RA agent at a certain time. The RA agent can then receive a job start request from the scheduling engine 300 over the RA framework and can start, monitor and control the job and can return job information as well as job return state of the RA jobs to the scheduling server 300.

In one embodiment, the system includes a first computer, a second computer, and a server as described above. For example, the first computer may be configured to receive a graphical user interface part 230 of a deployment file 1000 from a server, the deployment file 1000 configured to cause a second computer to perform a computer-implemented job, load the graphical user interface part 230 of the deployment file 1000 on the first computer, display an interactive graphical user interface on a display device 9 in data communication with the first computer, and send job-configuration parameter to the server. The second computer may be configured to receive an agent part 120 of the deployment file 1000 from the server, load the agent part 120 of the deployment file 1000, and perform the computer-implemented job according to a job-configuration parameter provided by the first computer. The server may be coupled to the first computer and to the second computer. In such an embodiment, the server may be configured to send the graphical user interface part 230 of the deployment file 1000 to the first computer, send an agent part 120 of a deployment file 1000 to the second computer, and send the job-configuration parameter to the second computer.

In one embodiment, of the system of FIG. 9, the GUI client 200 may comprise a first computer, the host 100 may comprise a second computer, and the automation engine 300 may comprise a server. For example, the first computer may be configured to receive a graphical user interface part 230 of a deployment file 1000 from a server, the deployment file 1000 may be configured to cause a second computer to perform a computer-implemented job 122. The first computer may also load the graphical user interface part of the deployment file 1000 on the first computer, and display an interactive graphical user interface on a display device in data communication with the first computer, and send job-configuration parameter to the server. The second computer may be configured to receive an agent part of the deployment file 1000 from the server, load the agent part of the deployment file 1000, and perform the computer-implemented job according to a job-configuration parameter provided by the first computer. The server may be coupled to the first computer and to the second computer. In such an embodiment, the server may be configured to send the graphical user interface part of the deployment file 1000 to the first computer, send an agent part of a deployment file 1000 to the second computer, and send the job-configuration parameter to the second computer.

Figure 10:
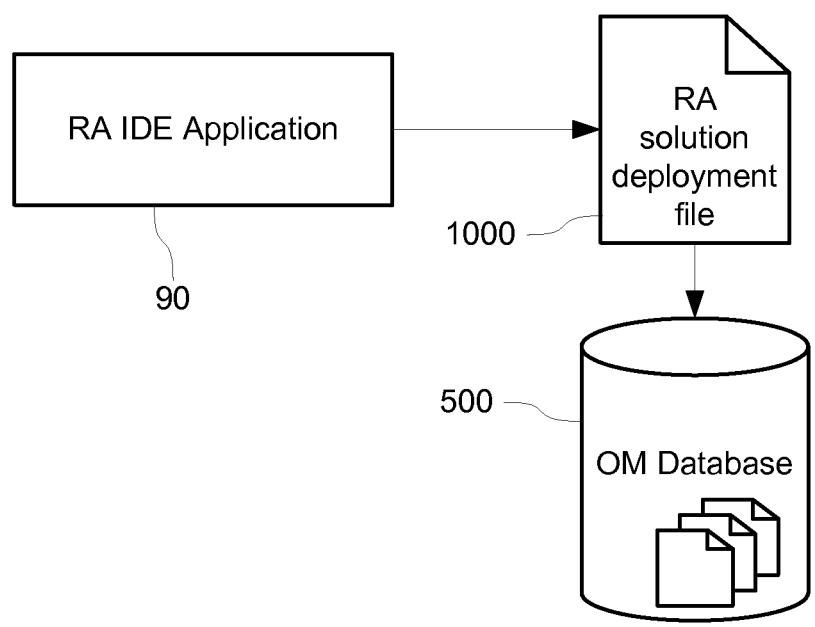
FIG. 10 is a block diagram showing the scheme of deploying an RA solution.

FIG. 10 is a bock diagram illustrating the deployment process of an RA solutions. The solution can be developed and tested using an integrated development environment (IDE) application 90. The resulting solution can be an RA deployment file 1000 as shown in FIG. 4 which can comprise a host part 1100 and a GUI part 1200. Once the solution is built, the deployment file 1000 can be loaded to the database or data store 500 and the deployment process is finished.

In another embodiment, the method may include receiving an agent part of a deployment file 1000 on a second computer, the deployment file 1000 configured to cause the second computer to perform a computer-implemented job. Such an embodiment may also include loading the agent part of the deployment file 1000 on the second computer, and performing the computer-implemented job on the second computer according to a job-configuration parameter provided by a first computer configured to run a graphical user interface part of the deployment file 1000.

In one particular embodiment, the method includes accessing a database managed by a server. In a further embodiment, the method may include obtaining the agent part of the deployment file 1000 from the database. The method may also include obtaining the job-configuration parameter from the database. In particular, the agent part may be configured to obtain the job-configuration parameter asynchronously from the database.

As the computer-implemented job is completed, the method may include storing a result of the computer-implemented job in the database. In one embodiment, the method includes synchronously communicating the result of the computer-implemented job to the first computer. Alternatively, the method may include asynchronously communicating the result of the computer-implemented job to the first computer through the database.

Another embodiment of a method is presented. In such an embodiment, the method may include receiving a request from a first computer for a graphical user interface part of a deployment file 1000, the deployment file 1000 configured to cause a second computer to perform a computer-implemented job. The method may also include obtaining the graphical user interface part of the deployment file 1000 from a database configured to be accessible by the first computer and the second computer. The method may additionally include communicating the graphical user interface part of the deployment file 1000 to the first computer.

In a further embodiment, the method may include receiving a job-configuration parameter from the first computer, and storing the job-configuration parameter in the database. The method may also include communicating a result of the computer-implemented job to the first computer for display with the graphical user interface part of the deployment file 1000.

Another embodiment of a method is presented. In one embodiment, the method includes sending an agent part of a deployment file 1000 to a second computer, the deployment file 1000 configured to cause the second computer to perform a computer-implemented job. The method may also include sending a job-configuration parameter to the second computer, a job-configuration parameter provided by a first computer configured to run a graphical user interface part of the deployment file 1000. In a further embodiment, the agent part of the deployment file 1000 and the job-configuration parameter are stored in a database.

The method may also include receiving a result of the computer-implemented job from the second computer, and storing the result of the computer-implemented job in the database configured to be accessible by the first computer and the second computer.

For example, FIG. 11, FIG. 12, FIG. 13, and FIG. 14 show example embodiments for the purpose of demonstration of some of the powerful capabilities of the present disclosure whereas the GUI-Client 200 uses has loaded only one Solution A 230, the RA-Framework 110 has loaded only one RA-Host Part A 120. Solution A is a RA-Solution for connecting to an SAP installation. (SAP is an ERP program that can comprise of a couple of modules such as Human-Resources-Modules or Storage-Modules). In this example of FIGS. 11-14, the application 130 can be a running instance of SAP, whereas the module 120 and its example job-modules 122 are connected to it. Therefore, the purpose of the module 120 according to this example can be to connect to an SAP system and to provide a working environment for the job modules 122 in it. In these four figures, there are three job-modules 122 named RA-Job 1A, 2A, and 3A. Imagine, in this example, the RA-Job 1A provides the functionality to extract a list of employees of the company from the application 130—the SAP-System, the RA-Job 2A provides functionality to extract from SAP a list of cars available in the storage of the company, and the RA-Job 3A provides functionality to sell a car which is available in the storage of the SAP-system.

Figure 11:
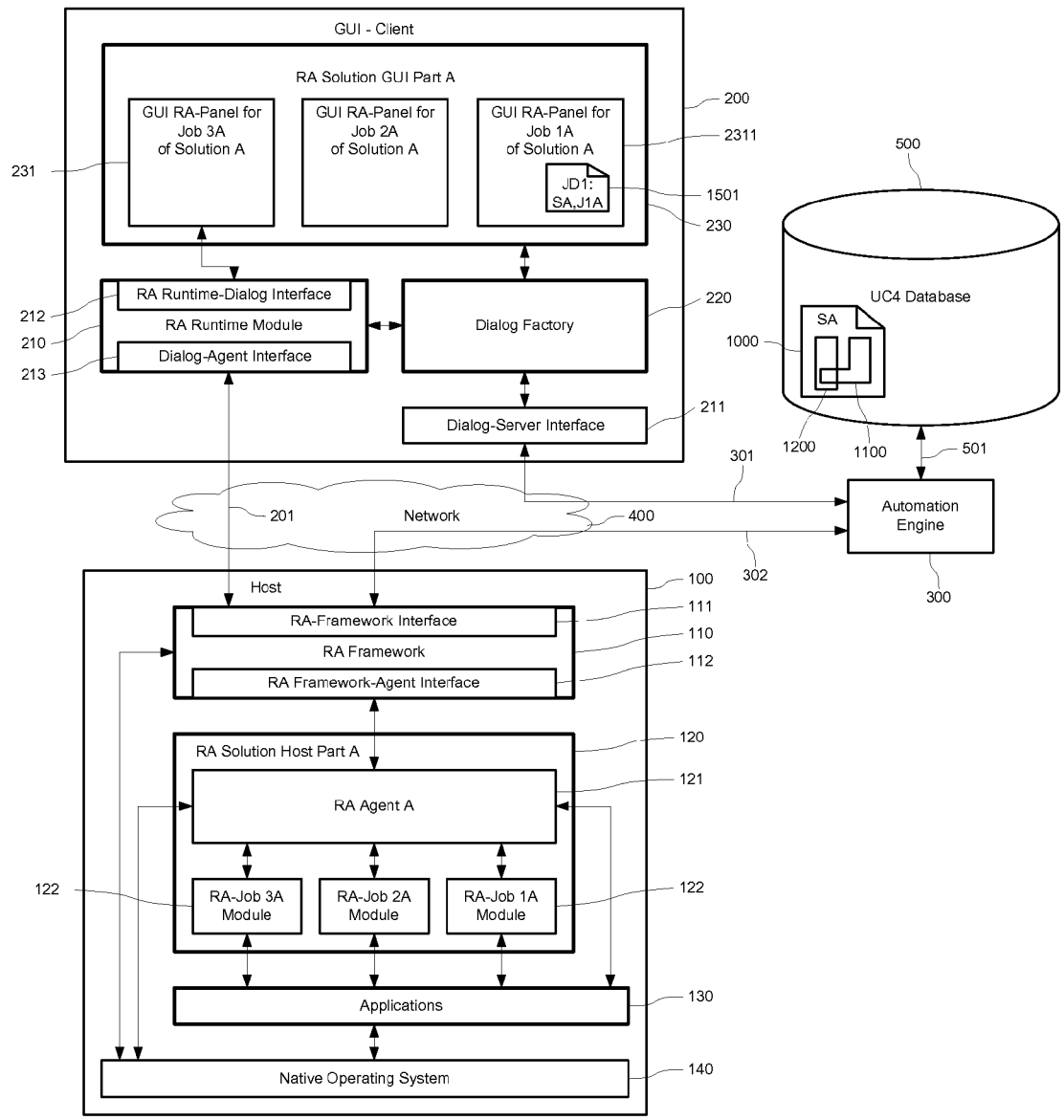
FIG. 11, FIG. 12, FIG. 13, and FIG. 14 are example embodiments using only one solution, the solution having three jobs.

In the example embodiment of FIG. 11, the user can use the stand-alone-GUI client 200 to connect to the Automation Engine 300. The can use the GUI 200 to see that an RA-Solution A 1000 (a jar file) is loaded in the database and that the agent part 1100 has already been transferred to the host 100 and loaded and activated by the running framework 110 to be an activated instance 120. Therefore, the user knows, he can define job-data (JD) for the jobs 122 activated on the host 100. To define data the user advises to Automation Engine 300 that he wants to create a new data-object for the RA-Solution A with number 1000. The Automation Engine loads the GUI part of the RA-Solution A from the jar-file 1000 stored in the database 500 and sends it forth to the GUI client 200. The interface 211 retrieves the GUI part 1200 from the Automation Engine and the Dialog Factory 220 renders and displays the GUI definition 230 stored in the GUI part 1200. The user sees that the GUI part of Solution A 230 enables him to see three panels 231 in this example. The three panels 231 correspond to the job definitions 122 loaded and activated in the activated module 120.

As a next step, the user wants to define job data for the RA-Job-A which is a job to extract a list of employees from SAP. The panel 2311 is the GUI-panel for the job 1A of solution A and in this example it might simply contain GUI-elements such as a drop-down-box to allow the user to specify a time period. Therefore, the user uses the panel 2311 to enter data for the job, and he selects or enters for example "3 years" as the user wants to extract the list of employees which have been with the company during the past three years. By entering data in the GUI the user creates Job-Data 1501, which can simply contain the information "3 years" and the identifier of the solution "A" (SA) and the number of the job "1A" (J1A). Now, the user wants to store that job-data "JD1:SA, J1A" 1501 and he clicks on "save" in the GUI. This causes the GUI 200 (to be precise the dialog factory 220) to transfer the job data 1501 to the Automation Engine 300 which stores the job-data 1501 in the database 500.

Figure 12:
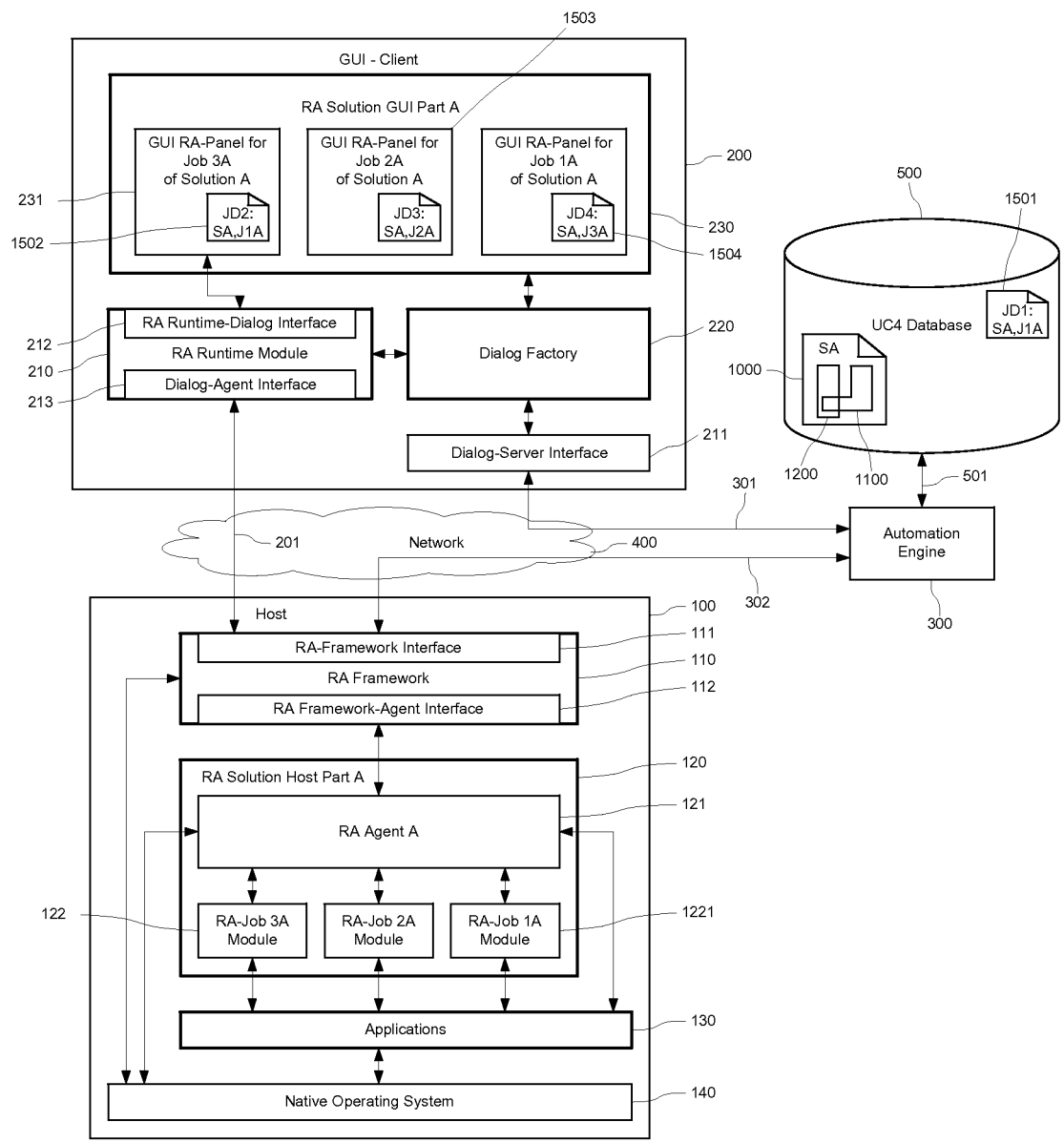

FIG. 12 shows this situation where the job data 1501 now is stored in the database 500. The job data 1501 now can wait for processing. As shown in FIG. 12, the user can use the panels 231 to define other data for the jobs "1A", "2A" and "3A" of the solution "A" 1000. When the user stores the job data, the job data 1502, 1503, and 1503 are sent to the Automation Engine 300 by the GUI 200 and the Automation Engine stores that job data into the database 500.

Figure 13:
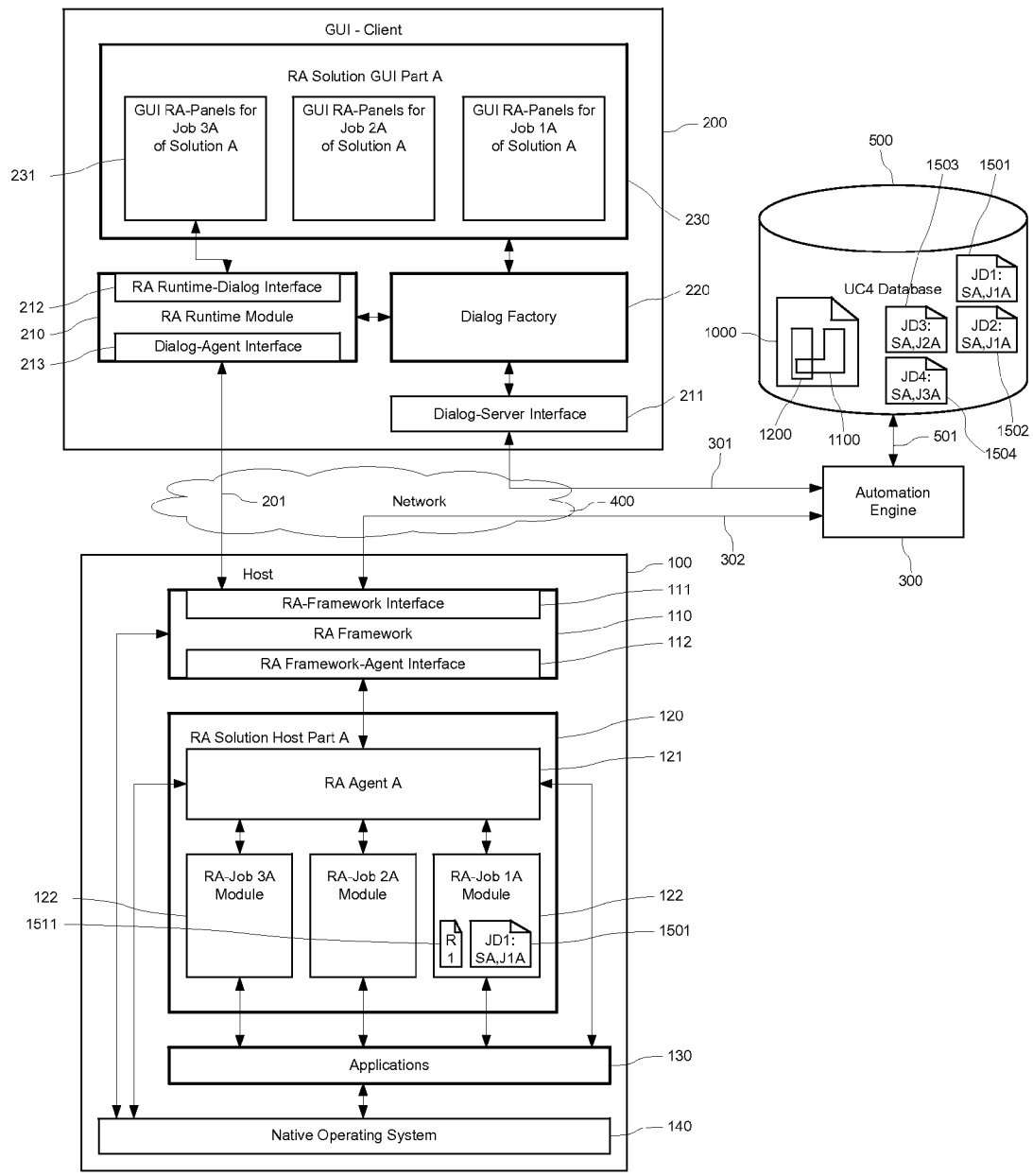

FIG. 13 shows the situation, when that job data 1502, 1503, and 1504 is stored in the database, too. This job data is called "job objects".

Job data can be processed at any time. As the Automation Engine is a scheduling engine, it can use scheduling processes that needs to have that job-data being processed at certain times. As an alternative, the user can decide to have this job-data, e.g. 1501, being processed immediately and he can click "Run" for a "job data" in the GUI to start the job. When a RA job is run, the job-data can be loaded from the database by the Automation Engine and can be transferred over the line 302 to the host 100. The framework 110 can receive that data and can forward it to the corresponding host solution module 120. The module 120 can receive the data 1501 and can forward it to the corresponding job 122, in this case the job module 1221. The job module 1221 can use the data provided in 1501 to retrieve a list of employees from SAP which are within the company for the past three years. The job module 1221 can send the information 1511 which is the result of the job back to the framework 110, while the framework can send this result back to the Application Engine for further processing. The Application Engine can than store the result 1511 in the database 500. The result 1511 basically then is new data in the database which can be used as input for subsequent jobs.

Figure 14:
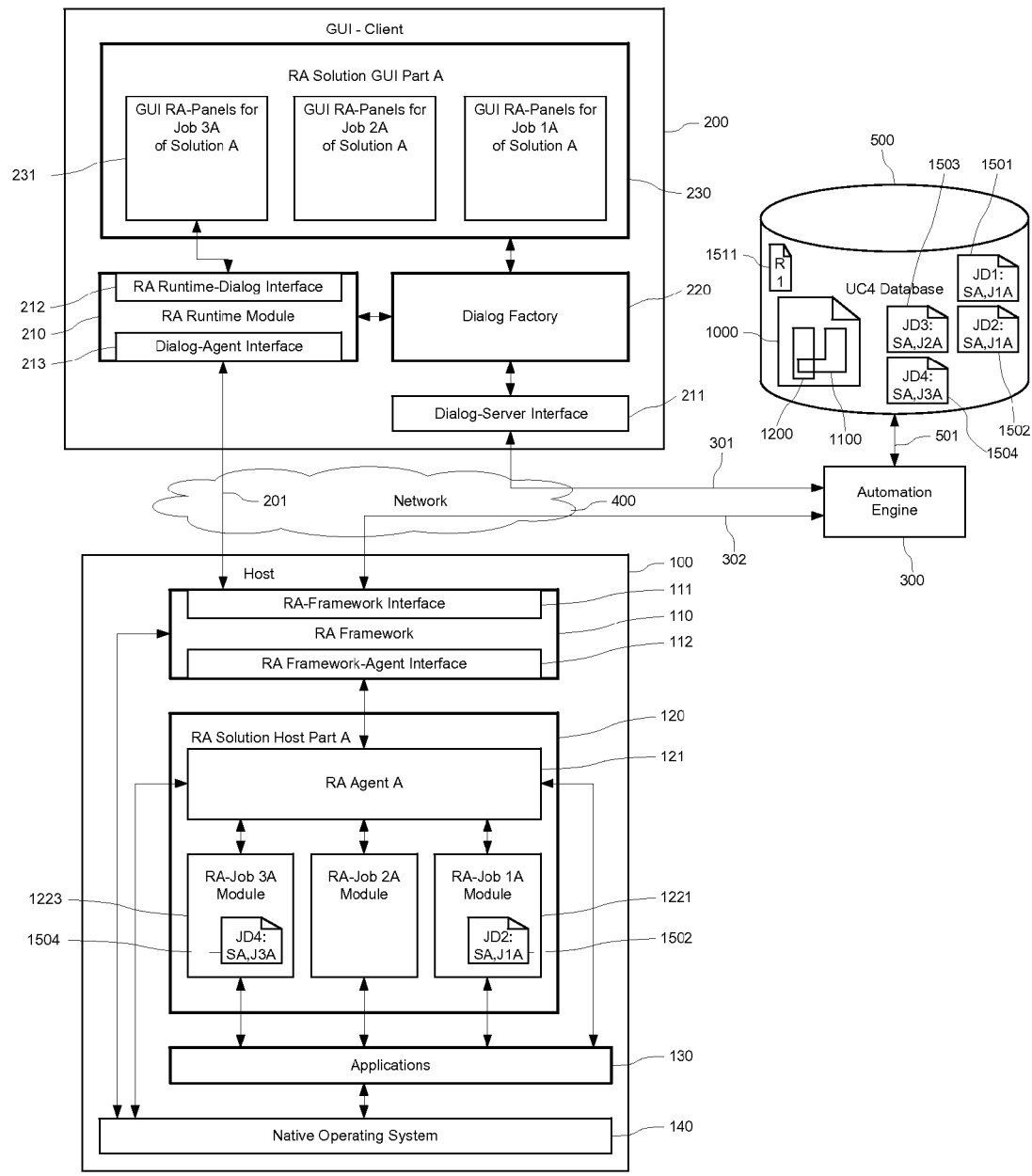
Figure 15:
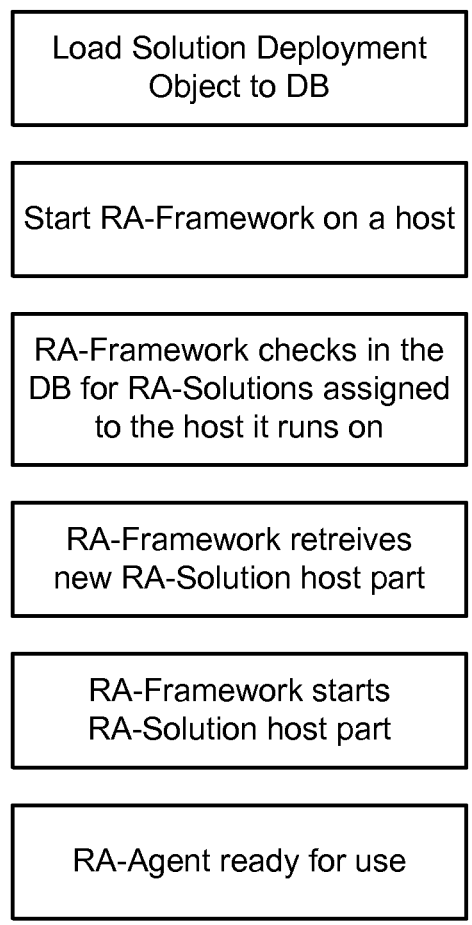
FIG. 15 is a block diagram illustrating the process of adding an RA-solution host part to an RA-framework.
Figure 16:
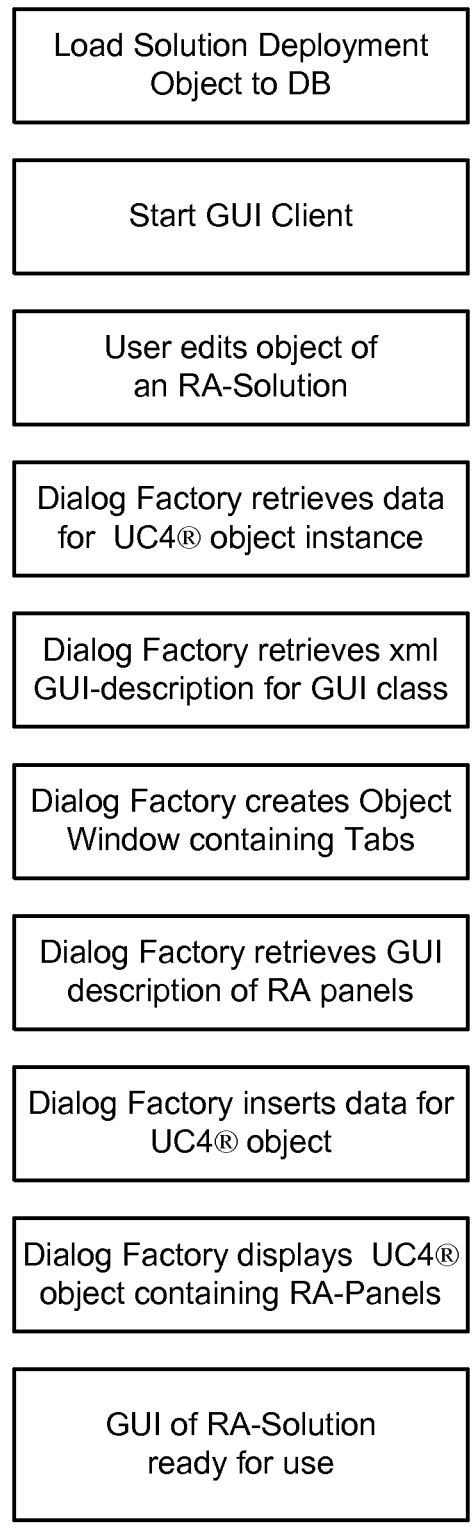
FIG. 16 is a block diagram illustrating the process of adding an RA-solution GUI part to a GUI client.
Figure 17:
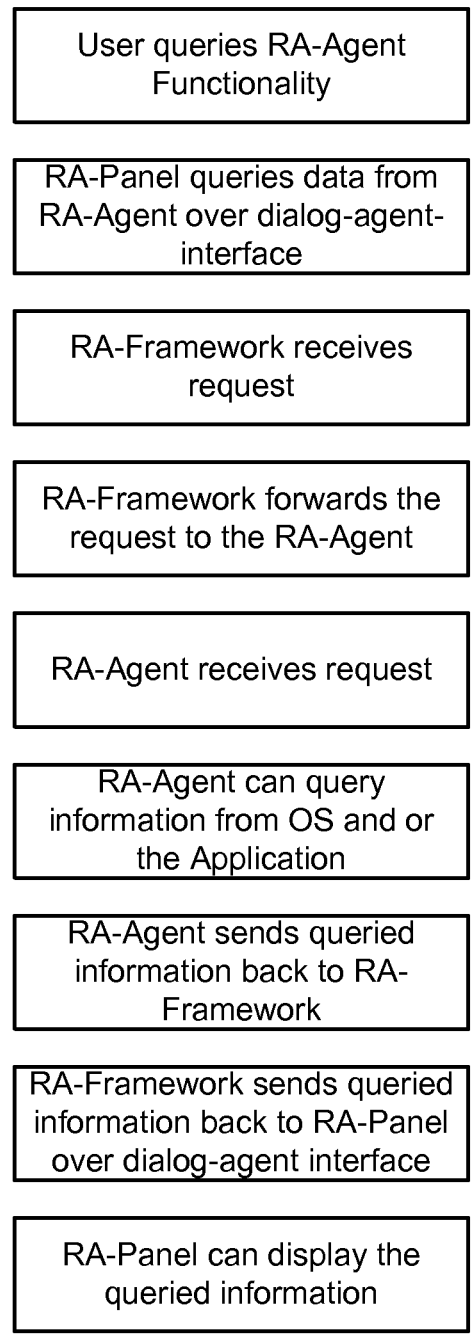
FIG. 17 is a block diagram illustrating the process of requesting information in an RA-panel from an RA-agent.
Figure 18:
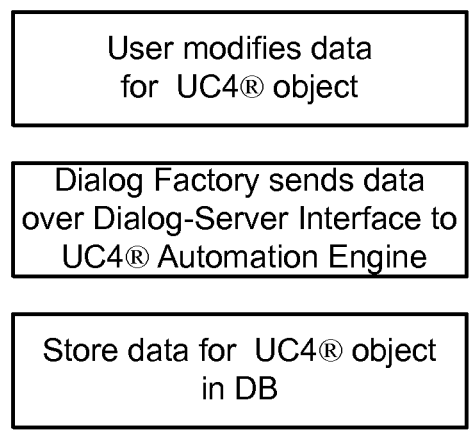
FIG. 18 is a block diagram illustrating the process of changing data for RA-solutions.
Figure 19:
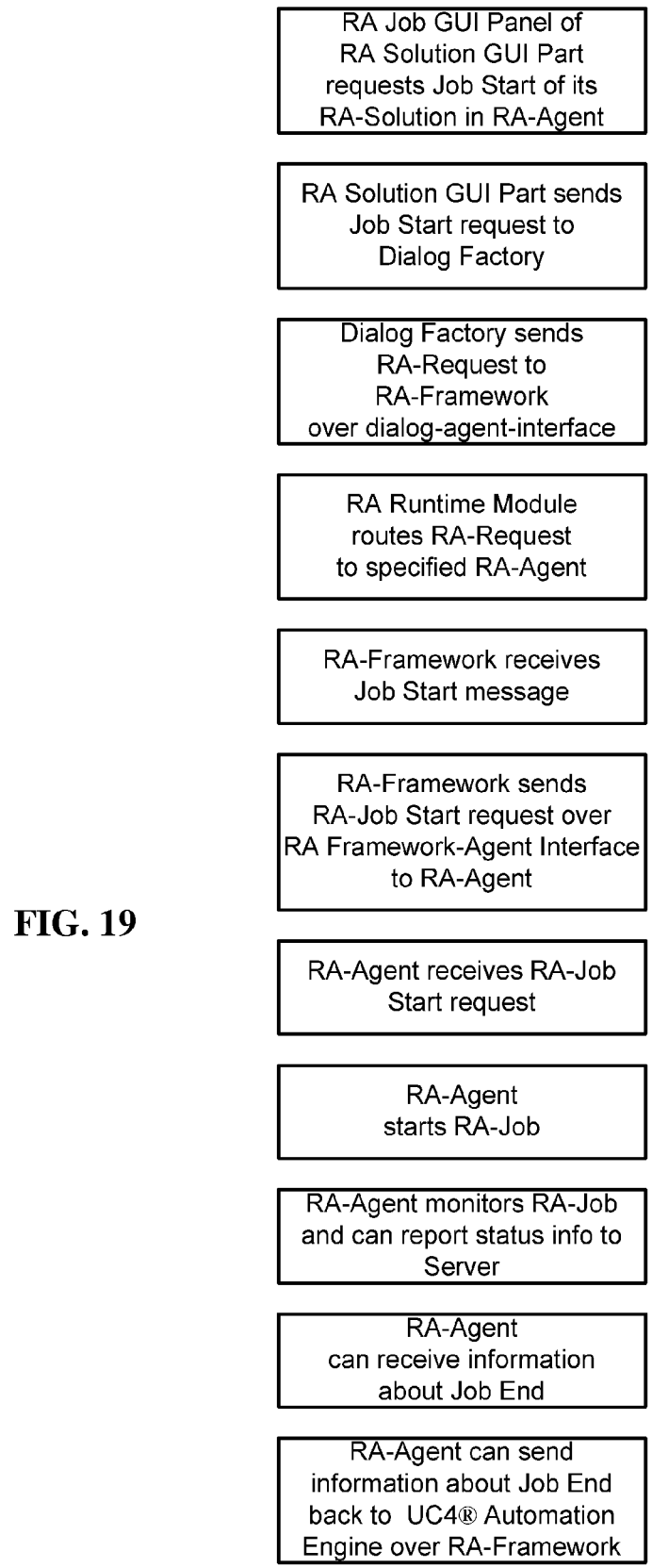
FIG. 19 is a block diagram illustrating the process of starting a job on an RA-agent directly from the GUI client.
Figure 20:
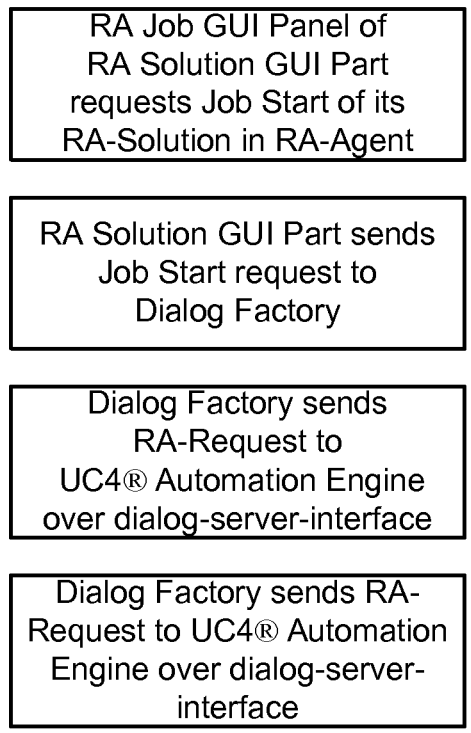
FIG. 20 is a block diagram illustrating the process of sending a job start request on an RA-agent directly.
Figure 21:
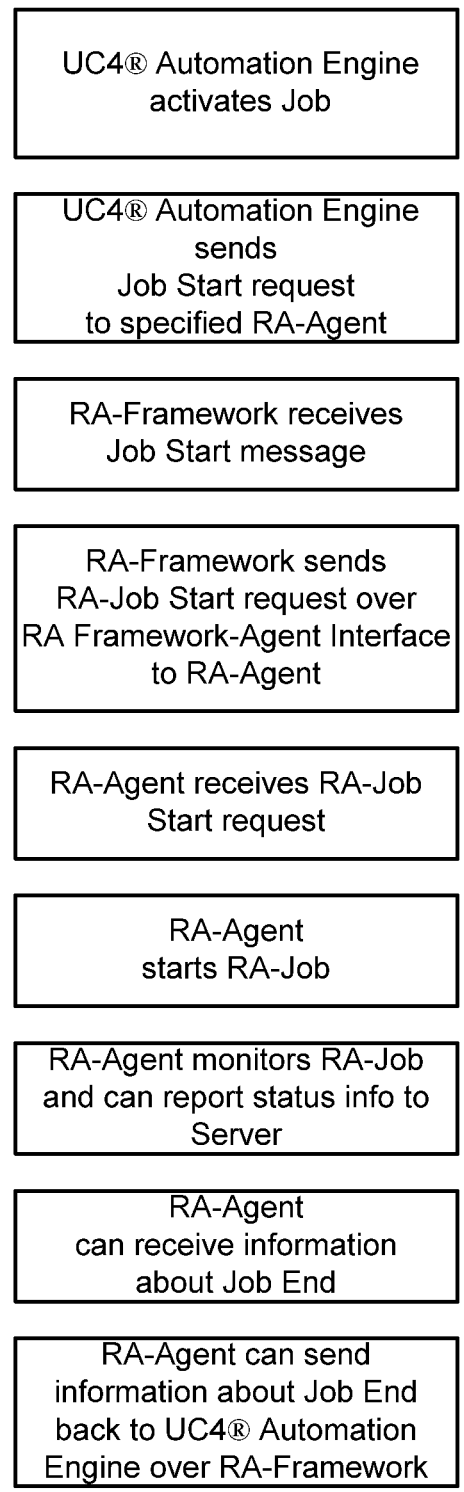
FIG. 21 is a block diagram illustrating the process of starting a job on an RA-agent from the Automation Engine.

FIG. 14 shows the situation when the data 1511 is stored in the database and the job data 1502 and 1504 have been loaded to their corresponding jobs 1221 and 1223.

The methods described herein can be accomplished using products commercially available from UC4 Software GmbH.

Each process disclosed herein can be implemented with a software program. The software programs described herein may be operated on any type of computer, such as personal computer, server, etc. Any programs may be contained on a variety of tangible computer program products. Illustrative computer program products include, but are not limited to information permanently stored on non-writable storage media (e.g., read-only memory devices within a computer such as CD-ROM disks readable by a CD-ROM drive) and alterable information stored on writable storage media (e.g., floppy disks within a diskette drive or hard-disk drive).

The disclosed embodiments can take the form of an entirely hardware embodiment or an embodiment containing both hardware and software elements. In one embodiment, the arrangements can be implemented in software, which includes but is not limited to firmware, resident software, microcode, etc. Furthermore, the disclosure can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Tangible computer program products comprising computer readable instructions, that when executed by a computer, cause the computer to perform the operations described above are also presented. In one embodiment, the computer program product may comprise data storage device comprising computer readable instructions for configuring a first computer, a second computer and a server as described below.

Another embodiment of a computer program product is presented. In one embodiment, the computer program product may include computer executable code configured to cause a computer system to include a database 500 configured to manage at least one deployment file 1000 comprising modules, the modules grouped in a GUI part and an agent part 120. The computer program product may also include code for a GUI client configured to load the GUI part of the deployment file. Additionally, the computer program product may include code for a framework configured to load the agent part of the deployment file, the agent part being platform independent and being startable and loadable by the framework. The GUI part may include a GUI description of the agent part. In one embodiment, the agent part may include jobs, the jobs being startable from the GUI part, the GUI part being configured to query information from the agent part, and where both the framework and the GUI can be run on different machines.

For example, the GUI client and the RA framework can be configured to retrieve instructions from a data storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters. The term "processor" means a physical processor, such as a microprocessor.

Figure 22:
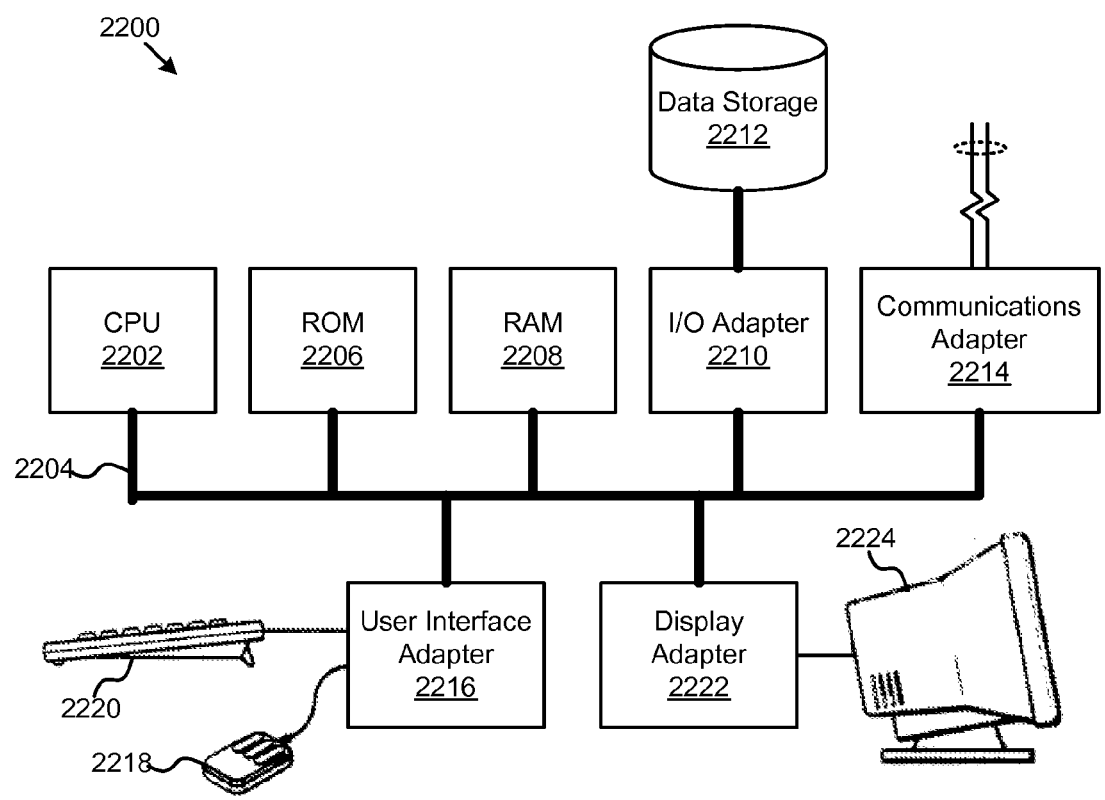
FIG. 22 is a schematic block diagram illustrating one embodiment of a computer hardware system adaptable for embodiments of the first computer, the second computer and the server.

FIG. 22 illustrates a computer system 2200 adapted according to certain embodiments of the first computer, the second computer, and the server and/or the user interface device 110. The central processing unit (CPU) 2202 is coupled to the system bus 2204. The CPU 2202 may be a general purpose CPU or microprocessor. The present embodiments are not restricted by the architecture of the CPU 2202, so long as the CPU 2202 supports the modules and operations as described herein. The CPU 2202 may execute the various logical instructions according to the present embodiments. For example, the CPU 2202 may execute machine-level instructions according to the exemplary operations described below with reference to FIGS. 15-21.

The computer system 2200 also may include Random Access Memory (RAM) 2208, which may be SRAM, DRAM, SDRAM, or the like. The computer system 2200 may utilize RAM 2208 to store the various data structures used by a software application configured to automation in distributed systems. The computer system 2200 may also include Read Only Memory (ROM) 2206 which may be PROM, EPROM, EEPROM, optical storage, or the like. The ROM may store configuration information for booting the computer system 2200. The RAM 2208 and the ROM 2206 hold user and system 100 data.

The computer system 2200 may also include an input/output (I/O) adapter 2210, a communications adapter 2214, a user interface adapter 2216, and a display adapter 2222. The I/O adapter 2210 and/or user the interface adapter 2216 may, in certain embodiments, enable a user to interact with the computer system 2200 in order to input information for the job parameters. These various adapters may include hardware devices, such as circuit cards comprising communications connectors, and the like. In a further embodiment, the display adapter 2222 may display a graphical user interface associated with a software or web-based application for automation in distributed systems.

The I/O adapter 2210 may connect to one or more storage devices 2212, such as one or more of a hard drive, a Compact Disk (CD) drive, a floppy disk drive, a tape drive, to the computer system 2200. The communications adapter 2214 may be adapted to couple the computer system 2200 to the network 106, which may be one or more of a LAN and/or WAN, and/or the Internet. The user interface adapter 2216 couples user input devices, such as a keyboard 2220 and a pointing device 2218, to the computer system 2200. The display adapter 2222 may be driven by the CPU 2202 to control the display on the display device 2224.

The present embodiments are not limited to the architecture of system 2200. Rather the computer system 2200 is provided as an example of one type of computing device that may be adapted to perform the functions of a server and/or the user interface device 110. For example, any suitable processor-based device may be utilized including without limitation, including personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

It will be apparent to those skilled in the art having the benefit of this disclosure that the present disclosure contemplates methods, systems, and media that can efficient handle processes in distributed systems. It is understood that the form of the arrangements shown and described in the detailed description and the drawings are to be taken merely as examples. It is intended that the following claims be interpreted broadly to embrace all the variations of the example embodiments disclosed.

What is claimed is:

1. A non-transitory tangible computer program product comprising computer readable instructions, that when executed by a computer, cause the computer to perform operations comprising:
   receiving a graphical user interface part of a deployment file on a first computer, the deployment file configured to cause a second computer to perform a computer-implemented job;
   loading the graphical user interface part of the deployment file on the first computer; and
   displaying an interactive graphical user interface on a display device in data communication with the first computer.

2. The tangible computer program product of claim 1, the instructions further comprising:
   receiving a job-configuration parameter from the interactive graphical user interface; and
   storing the job-configuration parameter in a database configured to be accessible by the first computer and the second computer.

3. The tangible computer program product of claim 2, wherein the database is accessible by the first computer and the second computer through data communications with a server coupled to the database.

4. The tangible computer program product of claim 1, the instructions further comprising:
   obtaining a result of the computer-implemented job from the second computer; and
   displaying results of the computer-implemented job in the interactive graphical user interface.

5. The tangible computer program product of claim 4, the instructions further comprising synchronously obtaining the result of the computer-implemented job from the second computer.

6. The tangible computer program product of claim 4, the instructions further comprising asynchronously obtaining the result of the computer-implemented job from a database.

7. A non-transitory tangible computer program product comprising computer readable instructions, that when executed by a computer, cause the computer to perform operations comprising:
   receiving an agent part of a deployment file on a second computer, the deployment file configured to cause the second computer to perform a computer-implemented job;
   loading the agent part of the deployment file on the second computer; and
   performing the computer-implemented job on the second computer according to a job-configuration parameter provided by a first computer configured to run a graphical user interface part of the deployment file.

8. The tangible computer program product of claim 7, the instructions further comprising accessing a database managed by a server.

9. The tangible computer program product of claim 8, the instructions further comprising obtaining the agent part of the deployment file from the database.

10. The tangible computer program product of claim 8, the instructions further comprising obtaining the job-configuration parameter from the database.

11. The tangible computer program product of claim 10, the agent part configured to obtain the job-configuration parameter asynchronously from the database.

12. The tangible computer program product of claim 8, the instructions further comprising storing a result of the computer-implemented job in the database.

13. The tangible computer program product of claim 8, the instructions further comprising synchronously communicating the result of the computer-implemented job to the first computer.

14. A non-transitory tangible computer program product comprising computer readable instructions, that when executed by a computer, cause the computer to perform operations comprising:
   receiving a request from a first computer for a graphical user interface part of a deployment file, the deployment file configured to cause a second computer to perform a computer-implemented job;
   obtaining the graphical user interface part of the deployment file from a database configured to be accessible by the first computer and the second computer; and
   communicating the graphical user interface part of the deployment file to the first computer.

15. The tangible computer program product of claim 14, the instructions further comprising:
   receiving a job-configuration parameter from the first computer; and
   storing the job-configuration parameter in the database.

16. The tangible computer program product of claim 14, the instructions further comprising communicating a result of the computer-implemented job to the first computer for display with the graphical user interface part of the deployment file.

17. A non-transitory tangible computer program product comprising computer readable instructions, that when executed by a computer, cause the computer to perform operations comprising:
sending an agent part of a deployment file to a second computer, the deployment file configured to cause the second computer to perform a computer-implemented job; and
sending a job-configuration parameter to the second computer, the job-configuration parameter provided by a first computer configured to run a graphical user interface part of the deployment file.

18. The tangible computer program product of claim 17, wherein the agent part of the deployment file and the job-configuration parameter are stored in a database.

19. The tangible computer program product of claim 17, the instructions further comprising:
receiving a result of the computer-implemented job from the second computer; and
storing the result of the computer-implemented job in the database configured to be accessible by the first computer and the second computer.

20. A non-transitory tangible computer program product comprising:
a database configured to manage at least one deployment file comprising modules, the modules grouped in a GUI part and an agent part;
a GUI client configured to load the GUI part of the deployment file;
a framework configured to load the agent part of the deployment file;
the agent part being platform independent and being startable and loadable by the framework;
the GUI part comprising a GUI description of the agent part;
the agent part comprising jobs, the jobs being startable from the GUI part;
the GUI part being configured to query information from the agent part; and
where both the framework and the GUI client can be run on different machines.

* * * * *